US011483687B2

(12) United States Patent
Balasubramanian et al.

(10) Patent No.: US 11,483,687 B2
(45) Date of Patent: Oct. 25, 2022

(54) POWER EFFICIENT ITERATIVE SENSOR FUSION

(71) Applicant: QUALCOMM Incorporated, San Diego, CA (US)

(72) Inventors: Anantharaman Balasubramanian, San Diego, CA (US); Junyi Li, Franklin Park, NJ (US); Kapil Gulati, Belle Mead, NJ (US); Dan Zhang, San Diego, CA (US); Chang-Sik Choi, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 17/180,677

(22) Filed: Feb. 19, 2021

(65) Prior Publication Data

US 2022/0272626 A1 Aug. 25, 2022

(51) Int. Cl.
*H04W 4/38* (2018.01)
*H04W 4/40* (2018.01)
(Continued)

(52) U.S. Cl.
CPC ............ *H04W 4/38* (2018.02); *H04W 4/40* (2018.02); *H04W 4/70* (2018.02); *H04W 24/02* (2013.01);
(Continued)

(58) Field of Classification Search
CPC ............................... B60R 21/01–0176; B60R 2021/01006–01345;
(Continued)

(56) References Cited

U.S. PATENT DOCUMENTS

2008/0215609 A1 9/2008 Cleveland et al.
2008/0270066 A1 10/2008 Blaser et al.
(Continued)

FOREIGN PATENT DOCUMENTS

| CN | 202102582 U | 1/2012 |
| WO | WO-2015087164 A1 | 6/2015 |
| WO | WO-2017172250 A1 * | 10/2017 ............... H04W 4/80 |

OTHER PUBLICATIONS

International Search Report and Written Opinion—PCT/US2021/065313—ISA/EPO—dated Apr. 8, 2022.

*Primary Examiner* — Timothy J Weidner
(74) *Attorney, Agent, or Firm* — Yanling Yang

(57) ABSTRACT

Methods, systems, and devices for wireless communications are described. A user equipment (UE) may select, based at least in part on a sensor selection criteria, a first subset of sensors from a set of available sensors of the UE, each sensor in the set of available sensors associated with a sensor type. The UE may perform, using the first subset of sensors, sensing operations to obtain a first sensing data, the first sensing data comprising sensing data measured by the UE during the sensing operations. The UE may transmit a first sensing report indicating the first sensing data. The UE may receive, based at least in part on the first sensing report, a second sensing report indicating a second sensing data, the second sensing data comprising a unified sensing report based on the first sensing report from the UE and one or more additional sensing reports from other UE.

24 Claims, 12 Drawing Sheets

(51) Int. Cl.
　　　H04W 4/70　　　(2018.01)
　　　H04W 24/02　　(2009.01)
　　　H04W 24/08　　(2009.01)
　　　H04W 24/10　　(2009.01)
　　　H04W 28/02　　(2009.01)
　　　H04W 52/02　　(2009.01)
　　　H04W 84/00　　(2009.01)
　　　H04W 84/18　　(2009.01)
　　　H04W 88/02　　(2009.01)
　　　H04W 88/08　　(2009.01)
　　　H04W 92/02　　(2009.01)
　　　H04W 92/10　　(2009.01)
　　　H04W 92/18　　(2009.01)

(52) U.S. Cl.
　　　CPC ........... *H04W 24/08* (2013.01); *H04W 24/10* (2013.01); *H04W 28/021* (2013.01); *H04W 28/0221* (2013.01); *H04W 28/0289* (2013.01); *H04W 52/0203* (2013.01); *H04W 52/0219* (2013.01); *H04W 52/0229* (2013.01); *H04W 84/005* (2013.01); *H04W 84/18* (2013.01); *H04W 88/02* (2013.01); *H04W 88/08* (2013.01); *H04W 92/02* (2013.01); *H04W 92/10* (2013.01); *H04W 92/18* (2013.01)

(58) Field of Classification Search
　　　CPC ... B60R 2300/10–8093; G05B 19/418–41895; G05B 23/02–0256; H04B 17/0082–3913; H04L 43/02–50; H04L 67/12–125; H04L 69/26; H04W 4/30–80; H04W 24/02–10; H04W 28/02–065; H04W 52/02–0296; H04W 84/005–22; H04W 88/005–188; H04W 92/02–24
　　　See application file for complete search history.

(56)　　　　　　References Cited

U.S. PATENT DOCUMENTS

2016/0247164 A1*　8/2016　Salajegheh ............. H04L 67/12
2016/0342155 A1　　11/2016　Boyd et al.
2019/0121782 A1　　4/2019　Sun et al.
2019/0261171 A1*　8/2019　Cozzetti ................. H04W 4/46

* cited by examiner

POWER EFFICIENT ITERATIVE SENSOR FUSION

FIELD OF TECHNOLOGY

The following relates to wireless communications, including power efficient iterative sensor fusion.

BACKGROUND

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support power efficient iterative sensor fusion. Generally, the described techniques provide various techniques to improve sensor operations performed by user equipment (UE), such as vehicle-based UE (v-UE). For example, in one approach the UE may initially select which sensor(s) to use (e.g., rather than always using all available sensors) for the sensing operations. The UE may initially select which sensor(s) to use randomly, based on its own identifier, etc. The UE may perform sensing operations using its selected sensor(s) and report its intrinsic sensing data (e.g., first sensing data) to the base station, which responds with the extrinsic sensing data (e.g., second sensing data). The extrinsic sensing data may correspond to a unified sensing report from the base station that is based on sensing reports received from multiple UE(s). The UE may update which sensor(s) to use for subsequent sensing operations based on its own intrinsic sensing data and the extrinsic sensing data. This may improve sensing operations by the UE by conserving power, minimizing unnecessary sensing, etc.

In another approach, the UE may receive the extrinsic sensing data (e.g., a sensing report) from the base station and select which sensor(s) to use based on the extrinsic sensing data (e.g., may not initially have its own intrinsic sensing data to use for sensor(s) selection). For example, the UE may receive the extrinsic sensing data from the base station in a sensing report and select a subset of its available sensor(s) to use for subsequent sensing operations based on the extrinsic sensing data. For example, the UE may determine the accuracy, completeness, reliability, etc., of the environmental details based on the extrinsic sensing data and then select the subset of sensors in response. For example, highly reliable extrinsic sensing data may indicate that additional sensors are unnecessary, whereas less reliable extrinsic sensing data may indicate that additional sensors are appropriate. Accordingly, the UE may update which sensors are used for sensing operations based on intrinsic and/or extrinsic sensing data.

A method for wireless communication at a UE is described. The method may include selecting, based on a sensor selection criteria, a first subset of sensors from a set of available sensors of the UE, each sensor in the set of available sensors associated with a sensor type, performing, using the first subset of sensors, sensing operations to obtain a first sensing data, the first sensing data including sensing data measured by the UE during the sensing operations, transmitting a first sensing report indicating the first sensing data, and receiving, based on the first sensing report, a second sensing report indicating a second sensing data, the second sensing data including a unified sensing report based on the first sensing report from the UE and one or more additional sensing reports from other UE.

An apparatus for wireless communication at a UE is described. The apparatus may include a processor, memory coupled with the processor, and instructions stored in the memory. The instructions may be executable by the processor to cause the apparatus to select, based on a sensor selection criteria, a first subset of sensors from a set of available sensors of the UE, each sensor in the set of available sensors associated with a sensor type, perform, using the first subset of sensors, sensing operations to obtain a first sensing data, the first sensing data including sensing data measured by the UE during the sensing operations, transmit a first sensing report indicating the first sensing data, and receive, based on the first sensing report, a second sensing report indicating a second sensing data, the second sensing data including a unified sensing report based on the first sensing report from the UE and one or more additional sensing reports from other UE.

Another apparatus for wireless communication at a UE is described. The apparatus may include means for selecting, based on a sensor selection criteria, a first subset of sensors from a set of available sensors of the UE, each sensor in the set of available sensors associated with a sensor type, means for performing, using the first subset of sensors, sensing operations to obtain a first sensing data, the first sensing data including sensing data measured by the UE during the sensing operations, means for transmitting a first sensing report indicating the first sensing data, and means for receiving, based on the first sensing report, a second sensing report indicating a second sensing data, the second sensing data including a unified sensing report based on the first sensing report from the UE and one or more additional sensing reports from other UE.

A non-transitory computer-readable medium storing code for wireless communication at a UE is described. The code may include instructions executable by a processor to select, based on a sensor selection criteria, a first subset of sensors from a set of available sensors of the UE, each sensor in the set of available sensors associated with a sensor type, perform, using the first subset of sensors, sensing operations to obtain a first sensing data, the first sensing data including sensing data measured by the UE during the sensing operations, transmit a first sensing report indicating the first sensing data, and receive, based on the first sensing report, a second sensing report indicating a second sensing data, the second sensing data including a unified sensing report based on the first sensing report from the UE and one or more additional sensing reports from other UE.

Some examples of the method, apparatuses, and non-transitory computer-readable medium described herein may further include operations, features, means, or instructions for selecting, according to the sensor selection criteria, the first subset of sensors randomly from the set of available sensors of the UE.

Some examples of the method, apparatuses, and non-transitory computer-readable medium described herein may further include operations, features, means, or instructions for selecting, according to the sensor selection criteria, the first subset of sensors based on an identifier associated with the UE.

Some examples of the method, apparatuses, and non-transitory computer-readable medium described herein may further include operations, features, means, or instructions for selecting, according to the sensor selection criteria, the first subset of sensors randomly from the set of available sensors based on a power usage metric associated with the first subset of sensors.

Some examples of the method, apparatuses, and non-transitory computer-readable medium described herein may further include operations, features, means, or instructions for performing, based on the second sensing report, additional sensing operations to obtain updated first sensing data and transmitting a third sensing report indicating the updated first sensing data.

Some examples of the method, apparatuses, and non-transitory computer-readable medium described herein may further include operations, features, means, or instructions for determining, based on the second sensing report, that a correlation between the unified sensing report and the first sensing data fails to satisfy a sensing accuracy threshold and selecting, based on the correlation failing to satisfy the sensing accuracy threshold, a second subset of sensors from the set of available sensors of the UE, the second subset of sensors including more sensors than the first subset of sensors.

Some examples of the method, apparatuses, and non-transitory computer-readable medium described herein may further include operations, features, means, or instructions for determining, based on the second sensing report, that the correlation between the unified sensing report and the first sensing data satisfies a low-end sensing accuracy threshold that may be a lower threshold than the sensing accuracy threshold, where selecting the second subset of sensors including more sensors may be based on the correlation satisfying the low-end sensing accuracy threshold.

Some examples of the method, apparatuses, and non-transitory computer-readable medium described herein may further include operations, features, means, or instructions for determining, based on the second sensing report, that a correlation between the unified sensing report and the first sensing data satisfies a sensing accuracy threshold and selecting, based on the correlation satisfying the sensing accuracy threshold, a second subset of sensors from the set of available sensors of the UE, the second subset of sensors including less sensors than the first subset of sensors.

A method for wireless communications at a UE is described. The method may include receiving a sensing report indicating a sensing data, the sensing data including a unified sensing report based on one or more sensing reports associated with other UE, selecting, based on the sensing report, a first subset of sensors from a set of available sensors of the UE, each sensor in the set of available sensors associated with a sensor type, and performing, using the first subset of sensors, sensing operations to obtain UE-measured sensing data during the sensing operations.

An apparatus for wireless communications at a UE is described. The apparatus may include a processor, memory coupled with the processor, and instructions stored in the memory. The instructions may be executable by the processor to cause the apparatus to receive a sensing report indicating a sensing data, the sensing data including a unified sensing report based on one or more sensing reports associated with other UE, select, based on the sensing report, a first subset of sensors from a set of available sensors of the UE, each sensor in the set of available sensors associated with a sensor type, and perform, using the first subset of sensors, sensing operations to obtain UE-measured sensing data during the sensing operations.

Another apparatus for wireless communications at a UE is described. The apparatus may include means for receiving a sensing report indicating a sensing data, the sensing data including a unified sensing report based on one or more sensing reports associated with other UE, means for selecting, based on the sensing report, a first subset of sensors from a set of available sensors of the UE, each sensor in the set of available sensors associated with a sensor type, and means for performing, using the first subset of sensors, sensing operations to obtain UE-measured sensing data during the sensing operations.

A non-transitory computer-readable medium storing code for wireless communications at a UE is described. The code may include instructions executable by a processor to receive a sensing report indicating a sensing data, the sensing data including a unified sensing report based on one or more sensing reports associated with other UE, select, based on the sensing report, a first subset of sensors from a set of available sensors of the UE, each sensor in the set of available sensors associated with a sensor type, and perform, using the first subset of sensors, sensing operations to obtain UE-measured sensing data during the sensing operations.

Some examples of the method, apparatuses, and non-transitory computer-readable medium described herein may further include operations, features, means, or instructions for determining, based on the sensing report, that a confidence metric of the sensing data satisfies a confidence threshold and selecting the first subset of sensors from the set of available sensors of the UE based on the confidence metric satisfying the confidence threshold.

Some examples of the method, apparatuses, and non-transitory computer-readable medium described herein may further include operations, features, means, or instructions for determining, based on the sensing report, that a confidence metric of the sensing data fails to satisfy a confidence threshold and selecting the first subset of sensors from the set of available sensors of the UE based on the confidence metric failing to satisfy the confidence threshold. Some examples of the method, apparatuses, and non-transitory computer-readable medium described herein may further include operations, features, means, or instructions for transmitting an indication of the UE-measured sensing data.

DETAILED DESCRIPTION

Figure 1:
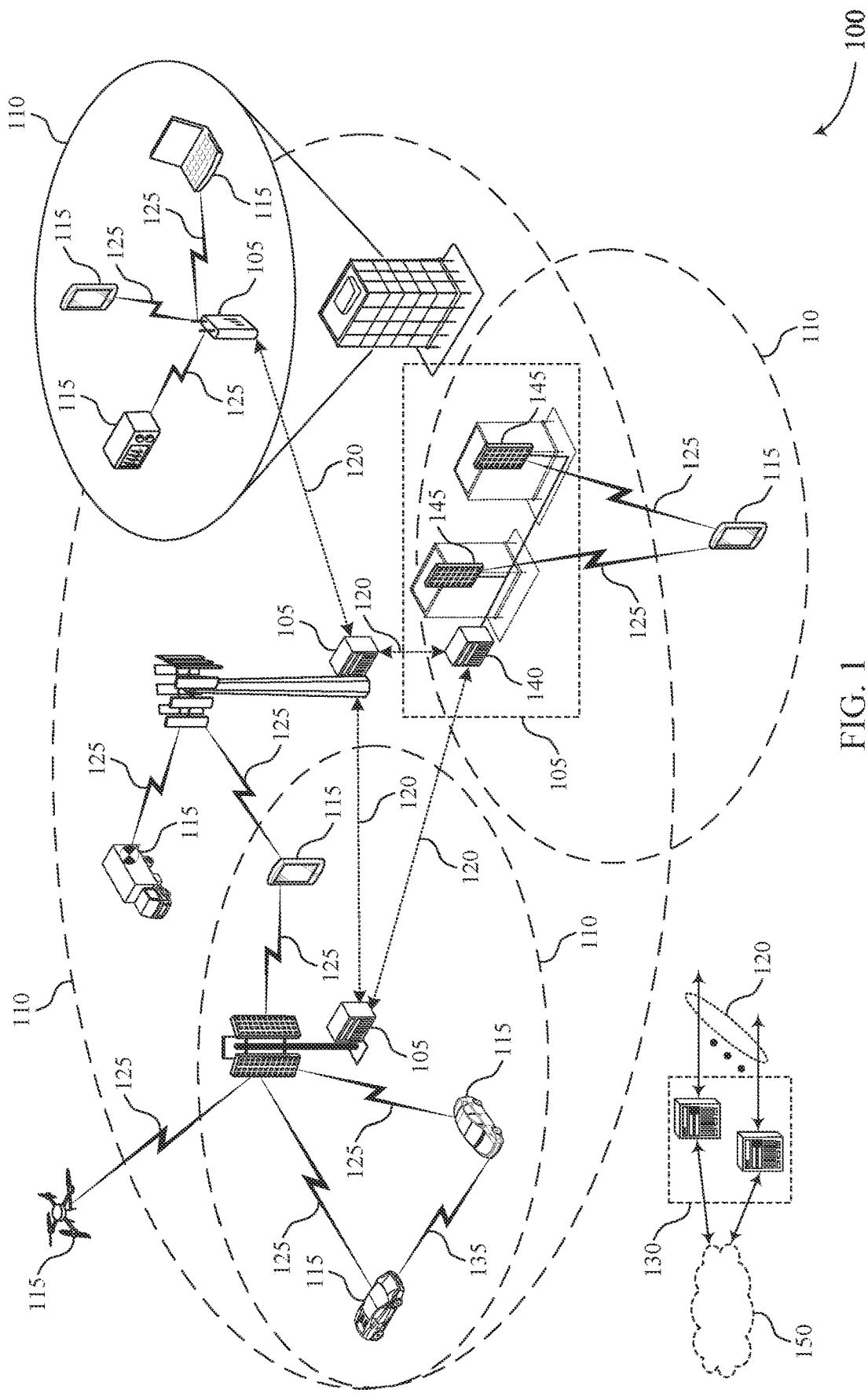
FIG. 1 illustrates an example of a wireless communication system that supports power efficient iterative sensor fusion in accordance with aspects of the present disclosure.

User equipment (UE), such as a vehicle based UE (v-UE), may be used for sensing operations using various sensors. For example, the UE may be configured with light detection and ranging (LIDAR) sensors, mono-camera sensors, stereo-camera sensors, ranging sensors, etc., and may use the sensors for measuring its environment (e.g., to identify and/or quantity structures, pedestrians, other vehicles, etc.) located in the area proximate to the UE. The UE may obtain its own sensing data (e.g., intrinsic sensing data) that it transmits to a base station (e.g., such as a roadside unit (RSU)). The base station collects intrinsic sensing data from multiple UEs and formulates extrinsic sensing data (e.g., a comprehensive or unified determination of the environment combining the intrinsic sensing data from multiple UE). The base station may send the extrinsic data to the UE to use for environmental awareness. However, there are currently no mechanisms to detail how the UE use their intrinsic and/or extrinsic sensing data generally, and more specifically in order to improve sensing operation efficiency. For example, in some wireless communication systems a v-UE simply defaults to using all available sensors at all times. However, this approach may be costly in terms of power usage, congestion within the sensed area (e.g., multiple v-UEs performing LIDAR sensing within a small area, resulting in collisions), and the like. Accordingly, aspects of the described techniques provide more efficient and considered approaches to how v-UEs select/update which sensor(s) to use.

Aspects of the disclosure are initially described in the context of wireless communication systems. Generally, the described techniques provide various techniques to improve sensor operations performed by user equipment (UE), such as vehicle-based UE (v-UE). For example, in one approach the UE may initially select which sensor(s) to use (e.g., rather than always using all available sensors) for the sensing operations. The UE may initially select which sensor(s) to use randomly, based on its own identifier, etc. The UE may perform sensing operations using its selected sensor(s) and report its intrinsic sensing data (e.g., first sensing data) to the base station, which responds with the extrinsic sensing data (e.g., second sensing data). The extrinsic sensing data may correspond to a unified sensing report from the base station that is based on sensing reports received from multiple UE(s). The UE may update which sensor(s) to use for subsequent sensing operations based on its own intrinsic sensing data and the extrinsic sensing data. This may improve sensing operations by the UE by conserving power, minimizing unnecessary sensing, etc.

In another approach, the UE may receive the extrinsic sensing data (e.g., a sensing report) from the base station and select which sensor(s) to use based on the extrinsic sensing data (e.g., may not initially have its own intrinsic sensing data to use for sensor(s) selection). For example, the UE may receive the extrinsic sensing data from the base station in a sensing report and select a subset of its available sensor(s) to use for subsequent sensing operations based on the extrinsic sensing data. For example, the UE may determine the accuracy, completeness, reliability, etc., of the environmental details based on the extrinsic sensing data and then select the subset of sensors in response. For example, highly reliable extrinsic sensing data may indicate that additional sensors are unnecessary, whereas less reliable extrinsic sensing data may indicate that additional sensors are appropriate. Accordingly, the UE may update which sensors are used for sensing operations based on intrinsic and/or extrinsic sensing data.

Aspects of the disclosure are further illustrated by and described with reference to apparatus diagrams, system diagrams, and flowcharts that relate to power efficient iterative sensor fusion.

FIG. 1 illustrates an example of a wireless communication system 100 that supports power efficient iterative sensor fusion in accordance with aspects of the present disclosure. The wireless communication system 100 may include one or more base stations 105, one or more UEs 115, and a core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs. or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of T, =1/ ($\Delta f_{max} \cdot N_f$) seconds, where $\Delta f_{max}$ may represent the maximum supported subcarrier spacing, and Nj may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrow % band communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 (e.g., a v-UE) may select, based at least in part on a sensor selection criteria, a first subset of sensors from a set of available sensors of the UE 115, each sensor in the set of available sensors associated with a sensor type. The UE 115 may perform, using the first subset of sensors, sensing operations to obtain a first sensing data, the first sensing data comprising sensing data measured by the UE 115 during the sensing operations. The UE 115 may transmit a first sensing report indicating the first sensing data. The UE 115 may receive, based at least in part on the first sensing report, a second sensing report indicating second sensing data, the second sensing data comprising a unified sensing report based on the first sensing report from the UE 115 and one or more additional sensing reports from other UEs.

A UE 115 (e.g., a v-UE) may receive a sensing report indicating a sensing data, the sensing data comprising a unified sensing report based on one or more sensing reports associated with other UE. The UE 115 may select, based at least in part on the sensing report, a first subset of sensors from a set of available sensors of the UE 115, each sensor in the set of available sensors associated with a sensor type. The UE 115 may perform, using the first subset of sensors, sensing operations to obtain UE-measured sensing data during the sensing operations.

Figure 2:
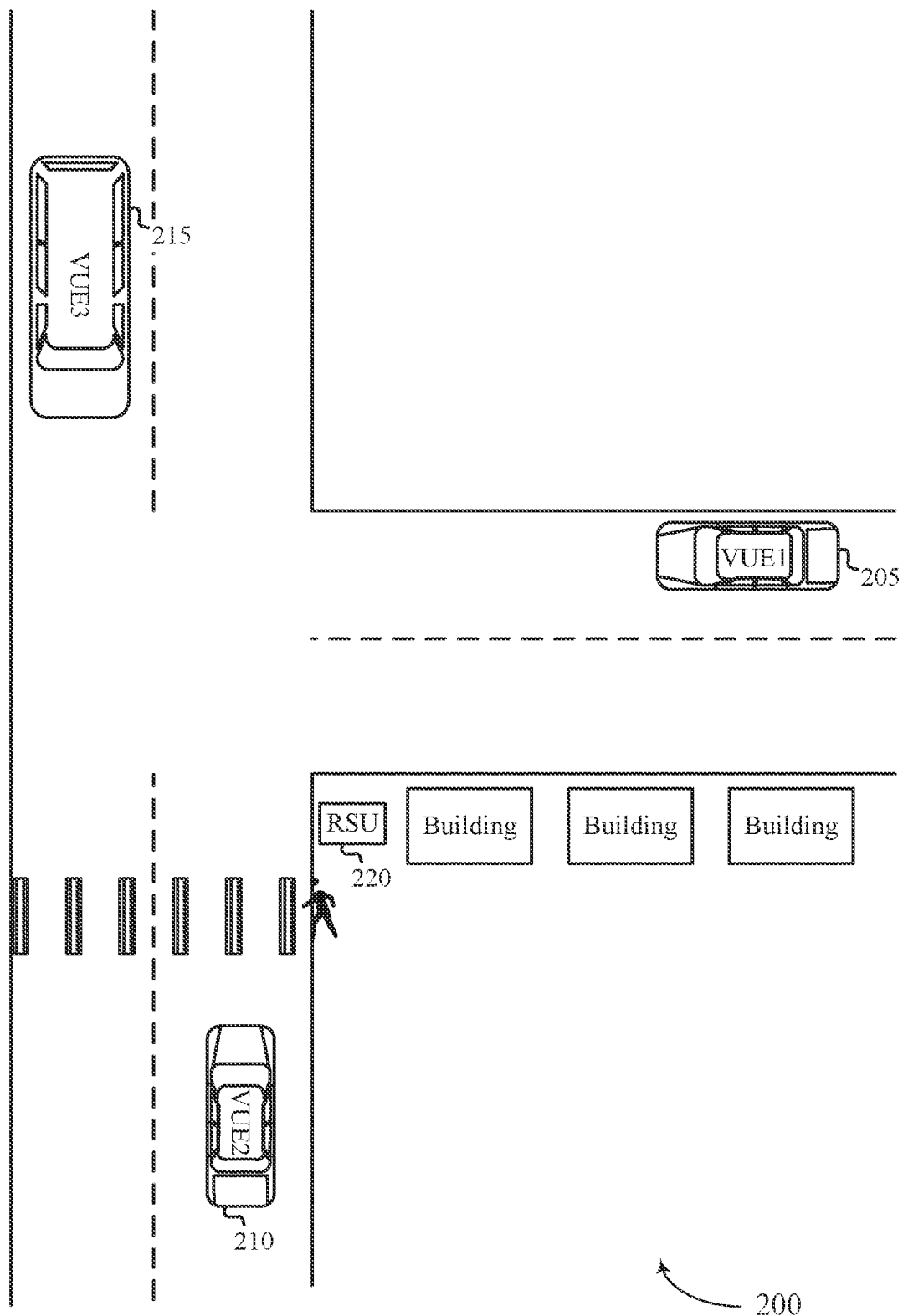
FIG. 2 illustrates an example of a wireless communication system that supports power efficient iterative sensor fusion in accordance with aspects of the present disclosure.

FIG. 2 illustrates an example of a wireless communication system 200 that supports power efficient iterative sensor fusion in accordance with aspects of the present disclosure. Wireless communication system 200 may implement aspects of wireless communication system 100. Wireless communication system 200 may include, UE 205, UE 210, UE 215, and RSU 220, which may be examples of the corresponding devices described herein. For example, UE 205, UE 210, and/or UE 215 may be examples of v-UEs or VUEs, as described herein. RSU 220 may be an example of aspects of a base station, as described herein. For example, RSU 220 may be implemented in a base station, as a functional component in communication with a base station, etc. In another example, RSU 220 may be a separate component/function in communication with a base station and monitoring, controlling, or otherwise managing aspects of VUE based communications, sensing operations, and the like.

Generally, it is not possible/practical for a vehicle (e.g., a v-UE, such as UE 205, UE 210, and/or UE 215) to be able to sense all/every object(s) around it in order to clearly understand the situational awareness. For example, occluding objects (e.g., buildings, trees, other VUE(s), etc.) may obscure the view of UE 205, thereby blocking from view the pedestrian crossing at the intersection in front of UE 210. This may occur even in the situation where vehicle (e.g., UE 205) were to use all of its available sensors (e.g., light detection and ranging (LIDAR), radio detection and ranging (RADAR), camera sensors, etc.). This may pose, in some situations, a danger to the pedestrian crossing the intersection, to other pedestrian(s), to other VUE(s), etc.

In order to address the inability of vehicles (e.g., UE 205, UE 210, and/or UE 215) to obtain an accurate sense of its surroundings, the sharing of sensor information may be generally used, wherein the vehicles exchange information associated with their sensed objects, thereby being able to obtain a more global view of the situational awareness. However, the sensing of objects by the vehicle(s) is prone to errors. Example errors include, but are not limited to, location errors of the objects being sensed due to inherent sensor errors, data association errors (e.g., identifying pedestrians close to each other, wherein the bounding boxes of pedestrians completely overlap with each other), and the like. In order that the global view is obtained by all vehicles in the system, it is natural that sensing is performed not only independently by an vehicle, but also cooperatively by such vehicles sharing their sensing data.

As one non-limiting example, sensed object one (OBJ-1). OBJ-2 etc., (e.g., pedestrians, other vehicles, buildings, etc.) may generally represent objects that nodes 1, 2, 3 (e.g., VUE1, VUE2, VUE3, etc.) are trying to detect. In one example, OBJ-1 may be preconfigured to be detected at a first location, OBJ-2 at a second location etc. Node 1, node 2, node 3 (e.g., VUEs) may provide intrinsic information (e.g., first sensing data, which may also be considered UE-measured sensing data) of a sensed object (e.g., at a specific geographic location) to another node, such as Node 0 (e.g., RSU 220). The intrinsic information transmitted by node 1 denotes its own perception of the sensed object, e.g., the sensing data obtained by node 1 (e.g., UE 205) using its own sensor(s). Node 0 (e.g., RSU 220) generally gathers the intrinsic information sent by nodes 1, 2, and/or 3, and transmits extrinsic information (e.g., second sensing data transmitted in a unified sensing report) to each of nodes 1, 2, and/or 3. Extrinsic information refers to the information not possessed originally by each of nodes 1, 2, and/or 3. That is, the extrinsic information provided via the sensing report may define a unified sensing report based on the sensing reports provided by nodes 1, 2, and/or 3 to node 0. For example, the extrinsic information transmitted by node 0 (e.g., RSU 220) to node 1 (e.g., UE 205) would be the combined intrinsic information obtained from node 2 (e.g., UE 210) and from node 3 (e.g., UE 215), not originally possessed by node 1 (e.g., UE 205). Extrinsic information transmitted by node 0 to node 2 would be the combined intrinsic information obtained from nodes 1 and 3, not originally possessed by node-2. Finally, nodes 1, 2, and/or 3 may infer the presence of the sensed object(s) from both the intrinsic and the extrinsic information.

Moreover, there is a power penalty (e.g., power usage exceeding a threshold) associated with a VUE using all its available sensors all the time to obtain the situational awareness for the vehicle. For example, as is illustrated in FIG. 2, even if the VUE were to use all of its available sensors, there is no guarantee that the vehicle is able to obtain an accurate sense of its surroundings (e.g., due to obstructions, such as buildings).

Such techniques generally fail to address numerous aspects of iterative sensing operations within a wireless communication system. One example may include an absence of support regarding how nodes 1, 2, and/or 3 (e.g., UE 205, UE 210, and UE 215, respectively) should transmit the first (initial) intrinsic information to node 0 when performing cooperative sensor fusion. Another example may include, based on the extrinsic information provided by node 0 (e.g., RSU 220) to each of nodes 1, 2, and/or 3, how should these nodes transmit subsequent intrinsic information to node 0. In another example, based on the extrinsic information provided by node 0, how can nodes 1, 2, and/or 3 adapt their respective sensor capabilities in a manner to improve power efficiency during sensing operations, yet be able to obtain as accurate as possible situational awareness (e.g., the global view) of its surroundings.

Accordingly, aspects of the described techniques provide various mechanisms to improve iterative sensing operations within wireless communication system 200. Such techniques generally provide mechanisms where UE 205, UE 210, and/or UE 215 improve power efficiency, cumulative results of the iterative sensing operations, and the like. Initially, it is to be understood that each of UE 205, UE 210, and/or UE 215 may have a set of available sensors that may be used for sensing operations. Each available sensor may be associated with a specific sensor type, e.g., such as a LIDAR sensing type, a RADAR sensing type, a camera sensing type (e.g., mono-camera, stereo-camera, etc.), a ranging sensor type, etc. As one non-limiting example, this may include node 1 (e.g., UE 205) being equipped with a LIDAR sensor, a RADAR sensor, and a camera sensor, node 2 (e.g., UE 210) being equipped with a LIDAR sensor, a mono-camera sensor, a stereo-camera sensor, and so forth.

Aspects of the described techniques broadly defined various mechanisms by which a UE (such as UE 205, UE 210, and/or UE 215) may select the first subset of sensors from the set of available sensors of the UE. That is, the described techniques provide mechanisms whereby the UE selects some (e.g., the first subset) of its available sensors to perform sensing operations. The UE may select the sensor(s) to be included in the first subset of sensors based on a sensor selection criteria. The UE sensor selection criteria may generally define a rule or criterion that the UE uses to determine which sensor(s) are to be initially included for sensing operations. This may avoid the situation where each UE defaults to using all available sensors when, in some examples, doing so may be impractical or unnecessary. The UE may typically perform sensing operations to measure, identify, or otherwise obtain a first sensing data (e.g., its intrinsic sensing data, which may also be considered UE-measured sensing data).

In one example, the UE may select the first subset of sensors randomly from the set of available sensors. That is, in one example each node may choose a random subset of its sensors to measure, identify, or otherwise obtain its initial intrinsic information. In one non-limiting example, node1 (e.g., UE 205) may choose or select its LIDAR and RADAR sensors as the first subset of sensors, whereas node 2 (e.g., UE 210) may choose or select its mono-camera sensor (e.g., to detect a preconfigured object at a preconfigured location). Since each node may choose a subset of its available sensors, all of the nodes in the wireless communication system may therefore use the same sensors or different sensors. This may generally provide diversity with respect to the sensors being used to be able to detect/quantify the object of interest. Accordingly, the sensor selection criteria may, in some examples, include UE 205, UE 210, and/or UE 215 randomly selecting their respective first subset of sensors to use for sensing operations.

In another example, the UE may select the first subset of sensors based on an identifier associated with the UE. That is, each node may choose the number of sensors based on its own identifier. As one example, a node associated with an odd numbered identifier may choose one sensor to provide initial intrinsic information, while a node with an even identifier may choose two sensors to provide its initial intrinsic information. Once the number of sensors is determined based on the identifier, the actual sensor chosen by the node could be random. For example, node 1 with an odd identifier may choose a LIDAR sensor as its first subset of sensors, while node 2 with an even identifier may choose LIDAR and stereo-camera sensors as its first subset of sensors. Accordingly, in this example the sensor selection criteria may include each of UE 205, UE 210, and/or UE 215 choosing the number and/or which sensor(s) to be included in the first subset of sensors based on their respective identifiers.

In another example, the UE may select the first subset of sensors randomly from the set of available sensors based on a power usage metric associated with each sensor. That is, in this example all of the nodes in the system may begin to transmit with only one sensor, which may be the same sensor or different sensors across different UE. For example, each node in the system may choose a sensor that has the least power consumption (e.g., power usage metric). Even in the situation where all of the nodes in that choosing the same sensor (e.g., a LIDAR sensor), the fact that each node has a different point of view to the object of interest may improve diversity in providing different initial intrinsic information from the different nodes.

For example, node 1 (e.g., UE 205) may have a clear line of sight in detecting an (pre-configured) object at a (preconfigured) location, while node 2 (e.g., UE 210) may not have a clear line of sight (e.g., occlusion due to buildings). Although nodes 1 and 2 may still use the same sensor in detecting the object, node-1 will presumably have a higher level of confidence in its initial intrinsic information than node 2.

Aspects of the examples discussed above may have various characteristics. For example, these techniques may ensure that not all sensors are being used by all nodes all the time for initial intrinsic information transmission, thereby conserving power. Moreover, each node transmits its initial intrinsic information (e.g., first sensing data) by using a minimum number of sensors (making the sensing operations power efficient), yet still being able to obtain the global view of the object due to the fact that different nodes have different points of view of the same object. This enables nodes to transmit different intrinsic information based on their respective sensing operations.

So for example, when nodes may choose sensor(s) randomly/deterministically based on the power level, node 1 may choose a sensor that expends power level p_1, while node 2 randomly chooses a sensor that expends power level p_2, where p_1>p_2. In one case, node(s) with an even identifier(s) may choose a sensor(s) with power threshold p_1, while node(s) with odd identifier(s) may choose a sensor(s) with power threshold p_2.

Accordingly, UE 205, UE 210, and/or UE 215 may each perform sensing operations using the sensor(s) in their respective first subset of sensors to obtain first sensing data, and then each UE may transmit a first sensing report indicating the first sensing data. The first sensing report may be transmitted to a base station, such as RSU 220, which may monitor, control, or otherwise manage aspects of sensing operations within wireless communication system 200. For example, the base station (e.g., RSU 220) may be configured or otherwise act within the wireless network as a device receiving intrinsic sensing data from UEs within the network. The base station may then identify, determine, or otherwise generate, a unified sensing report based on the sensing reports (e.g., the first sensing report received from the respective UEs). The unified sensing report received from the plurality of UEs within the wireless network may generally provide a unified or more comprehensive understanding of the situational awareness for UE 205, UE 210, and/or UE 215. That is, the base station may transmit or otherwise provide a second sensing report to each UE within the wireless network indicating second sensing data. In this context, the second sensing data may include the unified sensing report developed based on a first sensing report(s) received from various UEs within the network. In some aspects, the second sensing data may correspond to extrinsic sensing data/information in that includes sensing data that is not originally detected or otherwise sensed by the receiving node.

Aspects of the techniques described herein also provide various mechanisms by which such nodes (e.g., UE 205, UE 210, and/or UE 215) may perform subsequent sensing operations based on the second sensing report indicating the second sensing data (e.g., the extrinsic information) in a more efficient manner. That is, the described techniques address how the nodes should collect and transmit subsequent intrinsic information based on the extrinsic information received from node 0 (e.g., RSU 220) in a power efficient way. For example, UE 205, UE 210, and/or UE 215 may perform additional sensing operations to obtain updated first sensing data (e.g., the subsequent intrinsic information) based on the second sensing report. UE 205, UE 210, and/or UE 215 may transmit a third sensing report indicating the updated first sensing data.

For example, let $I_j^t$ be the initial intrinsic information (e.g., the first sensing data) provided by node j at time t using the first subset of sensors, and $E_j^{t+1}$ be the extrinsic information (e.g., the second sensing data) received by node j (e.g., j=1, 2, 3) from RSU 220 at time (t+1). In one example node j may switch on additional sensor(s)s at time t+1, (on top of the sensors it used at time t), to transmit new intrinsic information (e.g., the third sensing data) at time (t+1), based on the disparity between the extrinsic and the intrinsic information. Various options may be provided to support updating the subset of sensors used for sensing operations based on the extrinsic and the intrinsic sensing data.

In one example, this may include UE 205, UE 210, and/or UE 215 using the extrinsic information, in addition to their initial intrinsic information, to determine that a correlation between the unified sensing report fails to satisfy an accuracy threshold. For example, if $||I_j^t - E_j^{t+1}|| < THR1$, node j may uses $n_1$ additional sensors at time t+1, to detect the object, e.g., in order to obtain additional features of the object, thereby enabling new intrinsic information $I_j^{t+1}$ to be transmitted at time t+1. Accordingly, UE 205, UE 210, and/or UE 215 (e.g., any of which may be considered node j) may select a second subset of sensors from the set of available sensors of the UE, with the second subset of sensors have more sensors than the first subset of sensors (e.g., the node may add sensors for subsequent sensing operations).

In another example, this may include UE 205, UE 210, and/or UE 215 using the extrinsic information, in addition to their initial intrinsic information, to determine that the correlation between the unified sensing report and the first sensing data satisfies the sensing accuracy threshold. For example, if $||I_j^t - E_j^{t+1}|| < THR1$ (e.g., THR1≈0) denotes the condition that there is no significant difference between the intrinsic and extrinsic information, this may mean that node j's view of the state of the object is substantively the same as that of the other node's (except node j) view of the object. Hence node j may switch off some sensors to conserve power due to minimal additional information that it would obtain from its own sensing. Accordingly, UE 205, UE 210, and/or UE 215 may select the second subset of sensors from the set of available sensors, with the second subset having fewer sensors than the first subset of sensors.

In another example, the sensing accuracy threshold may be a range of accuracy or confidence levels used to assess the extrinsic and the intrinsic information. For example, a low-end sensing accuracy threshold may be defined that is a lower threshold than the previously discussed sensing accuracy threshold. For example, if $||I_j^t - E_j^{t+1}|| < THR2$, node j may use $n_2$ additional sensors at time t+1, e.g., in order to obtain additional features of the object, thereby enabling new intrinsic information to be transmitted at time $(t+1), I_j^{t+1}$.

In the examples discussed above, $n_2 \geq n_1$. That is, the greater the disparity between the extrinsic information and the intrinsic information is, the more additional sensors that node j switches on (e.g., to track the object more closely (and carefully), in an attempt to infer more information on the object). The more similar the extrinsic information and the intrinsic information is, node j may conserve power by switching off its sensors, or at least some of its sensors, without losing the ability to obtain the global view of the sensed object.

In the context of the first example, the additional features in one case may mean the following: at time t, node j uses a LIDAR sensor to transmit $I_j^t$ denoting the location of the object, for example. Due to disparity or differences between the extrinsic information and the intrinsic information, node j may switch on its RADAR sensor at time (t+1) to obtain range and velocity of the sensed object that aids in estimating the location more precisely, and transmits this as, $I_j^{t+1}$ at time (t+1). The additional feature represents range, velocity of the tracked object at time (t+1) due to turning on the RADAR sensor, which was not available at time t to node j. Accordingly, UE 205, UE 210, and/or UE 215 may determine that the correlation between the unified sensing report and the first sensing data satisfies the low-end sensing accuracy threshold that is a lower threshold than the sensing accuracy threshold. Selecting the second subset of sensors may be based on the correlation satisfying the low-end sensing accuracy threshold, even though the correlation may not have satisfied the original sensing accuracy threshold.

The techniques discussed above generally begin with UE 205, UE 210, and/or UE 215 transmitting their first sensing reports indicating intrinsic information developed during their sensing operations. However, in some examples UE 205, UE 210, and/or UE 215 do not have the initial first sensing data. That is, in some examples a UE (e.g., any of UE 205, UE 210, and/or UE 215) may receive the sensing data (e.g., the extrinsic information) from RSU 220 indicating the unified sensing report based on sensing reports associated with other UE (e.g., other VUE performing sensing operations within the wireless network). The UE may identify or otherwise select the first subset of sensors from the set of available sensors based on the sensing report indicating the extrinsic sensing data. The UE may then perform sensing operations using the first subset of sensors to obtain UE-measured sensing data (e.g., intrinsic information).

That is, in some examples the nodes may not have its intrinsic information to begin with. In one example, a node (e.g., UE 205) may not transmit any intrinsic information at time t (e.g., does not have any intrinsic information at time t). Upon reception of extrinsic information at time (t+1), the node transmit new intrinsic information, $I_j^{(t+1)}$ based solely on the extrinsic information $E_j^{(t+1)}$. In one example, this may include $E_j^{(t+1)} < THR1$, node j uses $n_1$ sensors at time t+1 to obtain additional features of the sensed object. This may enable new intrinsic information $I_j^{(t+1)}$ to be transmitted at time t+1.

In another example, if $THR1 < E_j^{(t+1)} < THR2$, node j may use $n_2$ additional sensors at time t+1, to transmit new intrinsic information $I_j^{(t+1)}$ at time t+1. In some examples, $n_2$ may be zero, e.g., due to the fact that all the other nodes strongly hypothesize the presence of the sensed object. In this situation, node j may not add new information from its own intrinsic sensing.

Figure 3A:
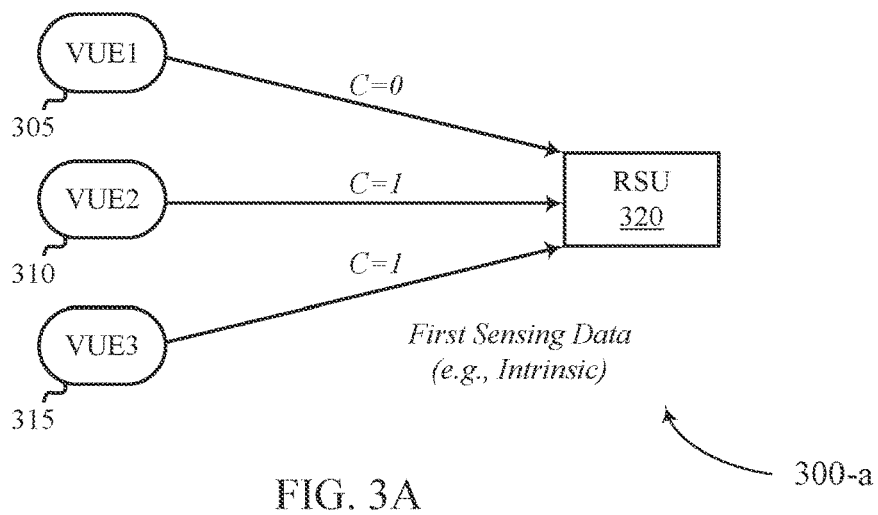
FIGS. 3A-3C illustrate an example of a wireless communication system that supports power efficient iterative sensor fusion in accordance with aspects of the present disclosure.
Figure 3B:
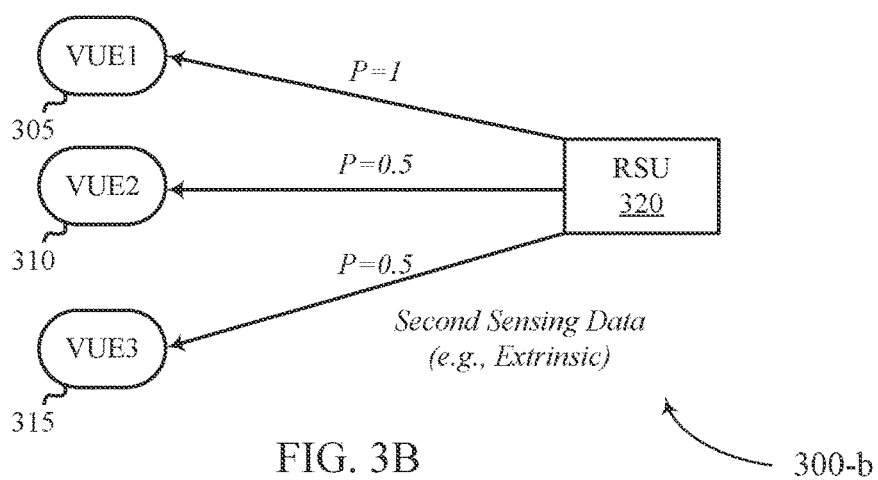
Figure 3C:
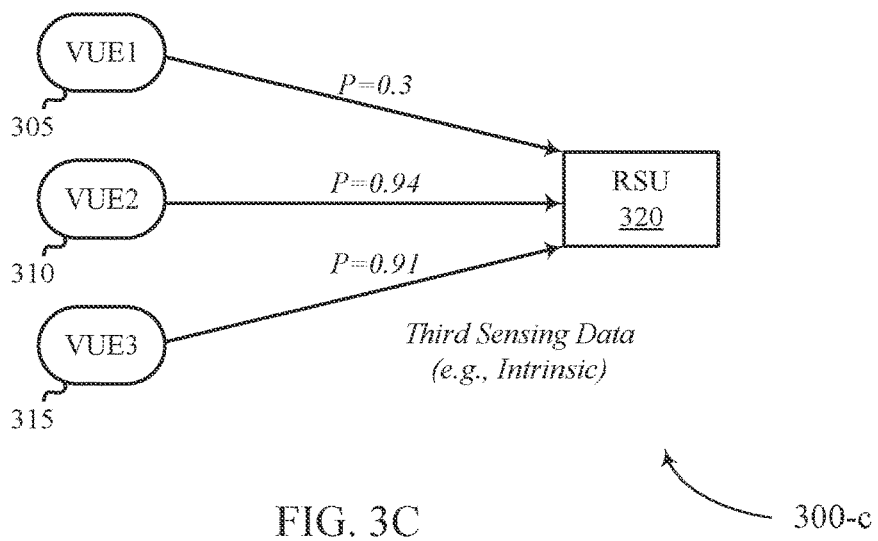

FIGS. 3A-3C illustrate an example of a wireless communication system 300 that supports power efficient iterative sensor fusion in accordance with aspects of the present disclosure. Wireless communication system 300 may implement aspects of wireless communication system 100. Wireless communication system 300 may include UE 305, UE 310, UE 315, and/or RSU 320, which may be examples of the corresponding devices described herein. For example, UE 305, UE 310, and/or UE 315 may be examples of a v-UE, as is described herein. RSU 320 may be an example of a base station and/or a device/function that controls, monitors, or otherwise manages aspects of sensing operations within wireless communication system 300. FIGS. 3A-3C generally illustrate steps that may be adopted in accordance with the techniques discussed herein, with wireless communication system 300-a of FIG. 3A illustrating a first step, wireless communication system 300-b of FIG. 3B illustrating a second step, and wireless communication system 300-c of FIG. 3C illustrating a third step.

As discussed herein, aspects of the described techniques provide various mechanisms that may be adopted for iterative sensing operations within wireless communication system 300. For example, UE 305 (e.g., VUE1), UE 310 (e.g., VUE2) and/or UE 315 (e.g., VUE3) may determine, identify, or otherwise select a first subset of sensors from a set of available set of sensors to use for sensing operations. That is, VUE1, VUE2, and/or VUE3 may each be equipped with a set of available sensors (the same sensors and/or different sensors). Each sensor may be associated with a different sensor type (e.g., LIDAR sensor type, RADAR sensor type, etc.). Each sensor type may be associated with a power usage metric indicating or otherwise associated with an amount of power being used by each sensor. VUE1, VUE2, and/or VUE 3 may initially select the sensor(s) to be used in the first subset of sensors randomly, based on an identifier associated with the VUE, based on the power usage metric associated with the sensor(s), and the like.

Each VUE may use its respective first subset of sensors to perform sensing operations. For example, each of UE 305, UE 310, and/or UE 315 may perform sensing operations using the sensor(s) selected for their respective first subset of sensors to measure, identify, or otherwise obtain first sensing data. The first sensing data in this context may be sensing data measured by the respective UE during the sensing operations (e.g., intrinsic sensing data or information). Each UE may then transmit or otherwise provide a first sensing report indicating its first sensing data.

For example and referring first to wireless communication system 300-a of FIG. 3A, UE 305 may transmit its first sensing report to RSU 320 indicating its first sensing data. UE 310 may transmit its first sensing report to RSU 320 indicating its first sensing data. And UE 315 may transmit its first sensing report to RSU 320 indicating its first sensing data. That is, each node (e.g., VUE) may provide its intrinsic information indicating the confidence (C) interval (e.g., in the range [0,1]) of the sensed objects' presence to RSU 320. As shown in FIG. 3A, VUE1, VUE2, and VUE3 may transmit, respectively, first sensing data with confidence levels of {0,1,1} to RSU 320 indicating the confidence of each VUE detecting the sensed object (e.g., pedestrian) at a location 2 (REG-2). That is, VUE1 thinks (e.g., senses) that there is no object located at REG-2 (i.e., confidence (C) of 0), while VUE2 and VUE3 do think (e.g., sense) the presence of the object at REG-2 (i.e., confidence (C) of 1).

Referring to wireless communication system 300-b of FIG. 3B, RSU 320 may receive the first sensing data in the first sensing reports from VUE1, VUE2, and/or VUE3. RSU 320 may receive the intrinsic information from UEs within its network and use the first sensing data to determine or otherwise identify a unified sensing report (e.g., a comprehensive situational picture/awareness). That is, RSU 320 receives the intrinsic information from all nodes and then transmits extrinsic information to each node. For example, RSU 320 may use the intrinsic information (e.g., the first sensing data contained in the first sensing reports) to determine extrinsic data (e.g., second sensing data contained in second sensing reports back to the VUEs). In one example, the extrinsic information about REG-2 (e.g., the location of the sensed object) that RSU 320 transmits to node 1 (e.g., VUE1), is based on what node 2 and node 3 indicates about REG-2 in their respective first sensing reports. In the example in FIG. 3B, RSU 320 transmits its second sensing data to the nodes, which indicate the probability (p) indication (e.g., p=1 to node-1), where p indicates the probability of the presence of the sensed object at location REG-2, as indicated by VUE2 and VUE3. As shown in FIG. 3A, both VUE2 and VUE3 both indicate the presence of object at location REG-2 (e.g., using the confidence (C) indications in the first sensing reports).

Turning to wireless communication system 300-c of FIG. 3C, UE 305, UE 310, and/or UE 315 may each then perform additional sensing operations to obtain updated first sensing data (e.g., third sensing data). For example, UE 305 (e.g., VUE1 or node 1), UE 310 (e.g., VUE2 or node 2), and/or UE 315 (e.g., VUE3 or node 3) may select a second subset of sensors to use for the additional sensing operations based on the extrinsic information received in the second sensing reports from RSU 320, as well as their initial intrinsic information. For example, node 1 has intrinsic information of {p=0} at time t, and extrinsic information of {p=1} at time (t+1). As there is a high dissimilarity between the intrinsic information and the extrinsic information (e.g., the correlation fails to satisfy a sensing accuracy threshold), node 1 may turn on additional sensors (e.g., RADAR) to obtain the range and velocity of the object. After tracking the object carefully for a longer duration, node 1 then obtains a higher confidence regarding the object's existence. With the additional sensor at time t+1, node 1 then estimates the new confidence of the object to be p=0.3 and sends this information to RSU 320 in a third or updated sensing report.

Nodes 2 and 3 both receive extrinsic information from RSU 320 with a probability indicator of {p=0.5} at time (t+1), while each node has an intrinsic information of {p=1} at time t. As extrinsic information, in this example, does not add new information (due to the 50% confidence indicated by p=0.5) to the already existing intrinsic information (with 100% confidence), nodes 2 and 3 in one case may choose to switch off one or more sensors (as they already have a strong understanding of the object due to 100% confidence). Alternately, in one case nodes 2 and 3 may not switch on additional sensors to obtain additional information on the same object, by retaining the same set of sensors used at time t. Accordingly, nodes 2 and 3 may determine that the correlation between the unified sensing report (e.g., the second sensing report) and the first sensing data satisfies the sensing accuracy threshold. In this instance, nodes 2 and 3 may maintain the original sensors as is or may select a second subset of sensors having fewer sensors than the first subset of sensors.

Accordingly, at time (t+1), nodes 1, 2, and 3 may transmit new intrinsic information, $I_j^{t+1}$ (j=1,2,3), obtained by adding new sensors (such as node 1) or retaining the same/reduced sensors (such as nodes 2 and 3) to transmit different/reduced/additional features. The intrinsic information transmission at time (t+1) is shown in FIG. 3C.

Figure 4:
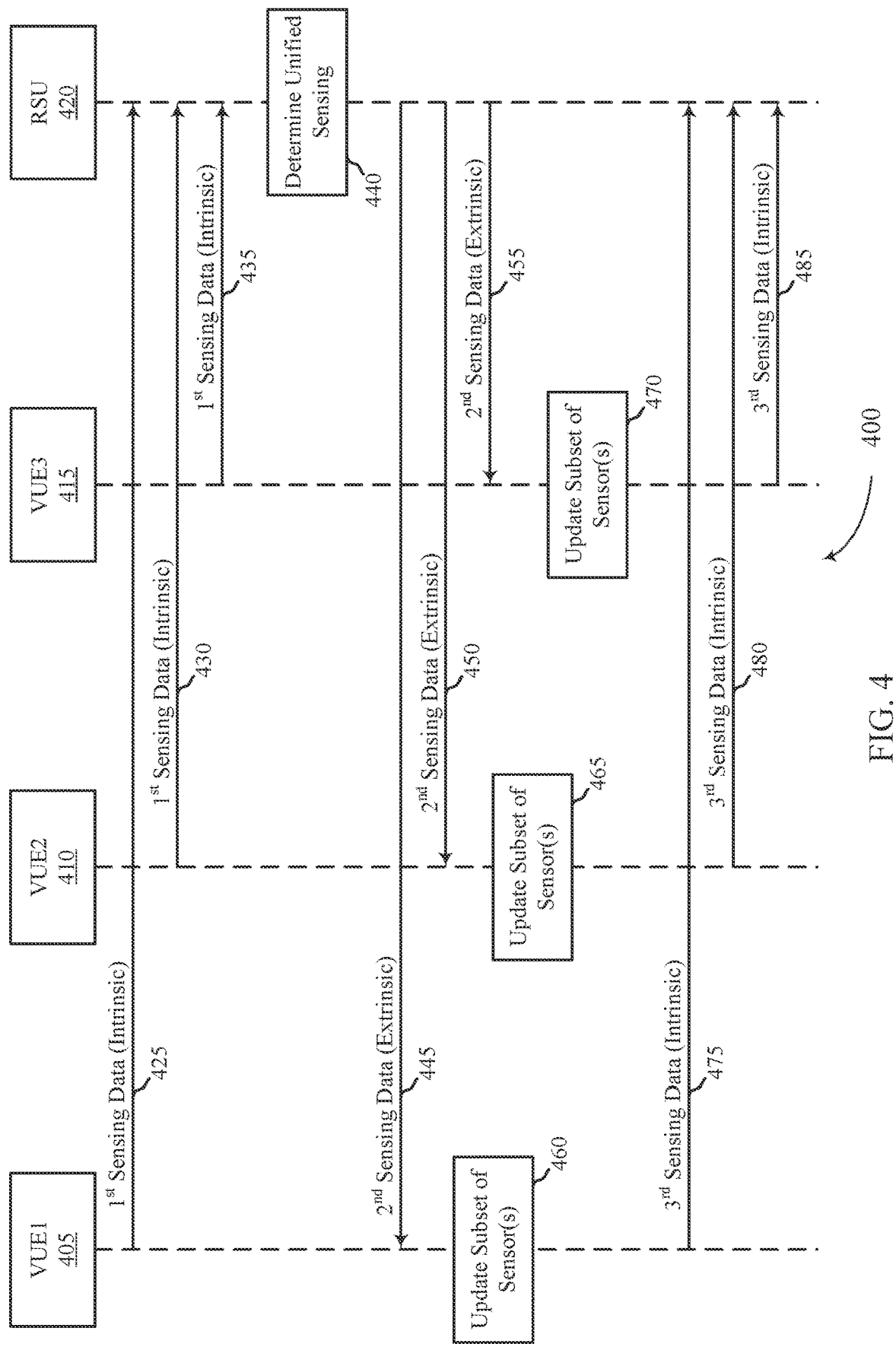
FIG. 4 illustrates an example of a process that supports power efficient iterative sensor fusion in accordance with aspects of the present disclosure.

FIG. 4 illustrates an example of a process 400 that supports power efficient iterative sensor fusion in accordance with aspects of the present disclosure. Process 400 may implement aspects of wireless communication systems 100, 200, and/or 300. Aspects of process 400 may be implemented at or implemented by VUE 405, VUE 410, VUE 415, and/or RSU 420, which may be examples of the corresponding devices described herein.

As discussed above, aspects of the described techniques may enable improved iterative sensing operations to be performed by VUE 405, VUE 410, VUE 415, and/or RSU 420. In those discussions, each of VUE 405, VUE 410, and VUE 415 (e.g., nodes 1, 2, and 3, respectively) may each perform sensing operations using a first subset of sensors, transmit a first sensing report to RSU 420 indicating first sensing data (e.g., the results of the sensing operations). RSU 420 may determine a unified sensing report based on the first sensing reports received from VUE 405, VUE 410, and VUE 415. RSU 420 transmits second sensing reports to VUE 405, VUE 410, and VUE 415 indicating second sensing data comprising the unified sensing data. VUE 405, VUE 410, and/or VUE 415 may update the sensor(s) used for sensing operations based at least in part on their own first sensing data (e.g., their own intrinsic information) and the second sensing report (e.g., the unified sensing report indicating extrinsic information). For example, the VUE may update its selected sensor(s) based on a confidence level satisfying one or more accuracy threshold(s).

For example and at 425, VUE 405 may transmit its first sensing report (e.g., intrinsic information) to RSU 420. Similarly and at 430, VUE 410 may transmit its first sensing report (e.g., intrinsic information) to RSU 420. And lastly at 435, VUE 415 may transmit its first sensing report (e.g., intrinsic information) to RSU 420. That is, each VUE may have selected their first subset of sensor(s) from their set of available sensors. The sensor(s) included in the first subset of sensors may be selected randomly, based on an identifier of the selecting VUE, based on a power usage metric associated with each sensor type, and the like. Each VUE may then perform the sensing operations using the sensor(s) included in their first subset of sensors to identify or otherwise obtain first sensing data (intrinsic information) that is indicated in the respective first sensing reports transmitted by each VUE.

At 440, RSU 420 may determine, identify, construct, or otherwise obtain a unified sensing report based on the first sensing report(s) received from VUE(s) within the wireless network. That is, RSU 420 may receive each first sensing report indicating the intrinsic information from each node. RSU 420 may identify a confidence level associated with each first sensing report. Based on the intrinsic information indicated in each first sensing report and associated confidence levels, RSU 420 may use the intrinsic information from multiple perspectives to develop a comprehensive situational awareness understanding of the environment (e.g., the location, speed, travel direction, identification, etc., for the sensed object(s)). RSU 420 may assign a confidence level probability metric to one or more sensed objects included in the unified sensing report.

At 445, RSU 420 may transmit the second sensing report (e.g., extrinsic information) to VUE 405. Similarly and at 450, RSU 420 may transmit the second sensing report (e.g., extrinsic information) to VUE 410. And lastly at 455, RSU 420 may transmit the second sensing report (e.g., extrinsic information) to VUE 415. That is, each VUE may receive the second sensing report indicating the extrinsic information. The extrinsic information may be compiled from the intrinsic information and provide additional information regarding the situational awareness of the environment.

At 460, VUE 405 may update the sensor(s) to be used for sensing operations based on the second sensing report and its own intrinsic information. At 465, VUE 410 may update the sensor(s) to be used for sensing operations based on the second sensing report and its own intrinsic information. At 470, VUE 415 may update the sensor(s) to be used for sensing operations based on the second sensing report and its own intrinsic information. That is, each VUE may update the sensor(s) included in the first subset of sensors (e.g., an updated first subset of sensor or a second subset of sensors). This may include adding some sensor(s), removing some sensor(s), etc. For example, each VUE may add sensors if the confidence level fails to satisfy a sensing accuracy threshold (e.g., add more sensors for sensing operations to develop a better understanding of its situational awareness). Conversely, each VUE may remove sensors if the confidence level satisfies the sensing accuracy threshold (e.g., remove sensors for sensing operations since the VUE has a high confidence it its understanding of its situational awareness). In some examples, multiple sensing accuracy thresholds may be used to determine when and/or which sensors should be added or removed from sensing operations.

Accordingly, VUE 405, VUE 410, and/or VUE 415 may, in coordination with RSU 420, rely on an iterative process to improve sensing efficiency, without losing confidence it its understanding of its situational awareness.

Figure 5:
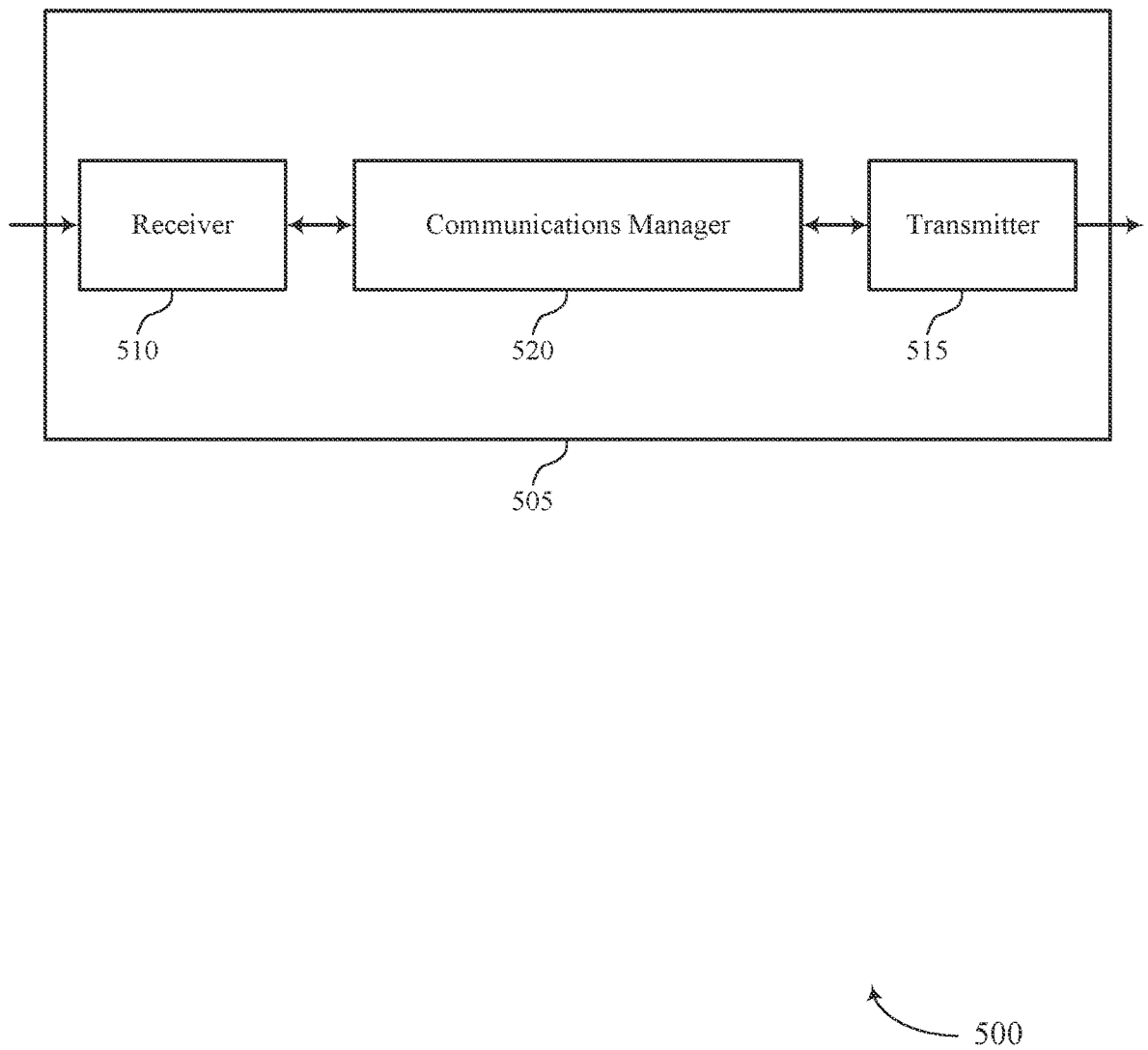
FIGS. 5 and 6 show block diagrams of devices that support power efficient iterative sensor fusion in accordance with aspects of the present disclosure.

FIG. 5 shows a block diagram 500 of a device 505 that supports power efficient iterative sensor fusion in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to power efficient iterative sensor fusion). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to power efficient iterative sensor fusion). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of power efficient iterative sensor fusion as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for selecting, based on a sensor selection criteria, a first subset of sensors from a set of available sensors of the UE, each sensor in the set of available sensors associated with a sensor type. The communications manager 520 may be configured as or otherwise support a means for performing, using the first subset of sensors, sensing operations to obtain a first sensing data, the first sensing data including sensing data measured by the UE during the sensing operations. The communications manager 520 may be configured as or otherwise support a means for transmitting a first sensing report indicating the first sensing data. The communications manager 520 may be configured as or otherwise support a means for receiving, based on the first sensing report, a second sensing report indicating a second sensing data, the second sensing data including a unified sensing report based on the first sensing report from the UE and one or more additional sensing reports from other UE.

Additionally, or alternatively, the communications manager 520 may support wireless communications at a UE in accordance with examples as disclosed herein. For example, the communications manager 520 may be configured as or otherwise support a means for receiving a sensing report indicating a sensing data, the sensing data including a unified sensing report based on one or more sensing reports associated with other UE. The communications manager 520 may be configured as or otherwise support a means for selecting, based on the sensing report, a first subset of sensors from a set of available sensors of the UE, each sensor in the set of available sensors associated with a sensor type. The communications manager 520 may be configured as or otherwise support a means for performing, using the first subset of sensors, sensing operations to obtain UE-measured sensing data during the sensing operations.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for improving accuracy and efficiency of iterative sensor fusion based on intrinsic and extrinsic sensing information being used to more optimally select sensor(s) for sensing operations.

Figure 6:
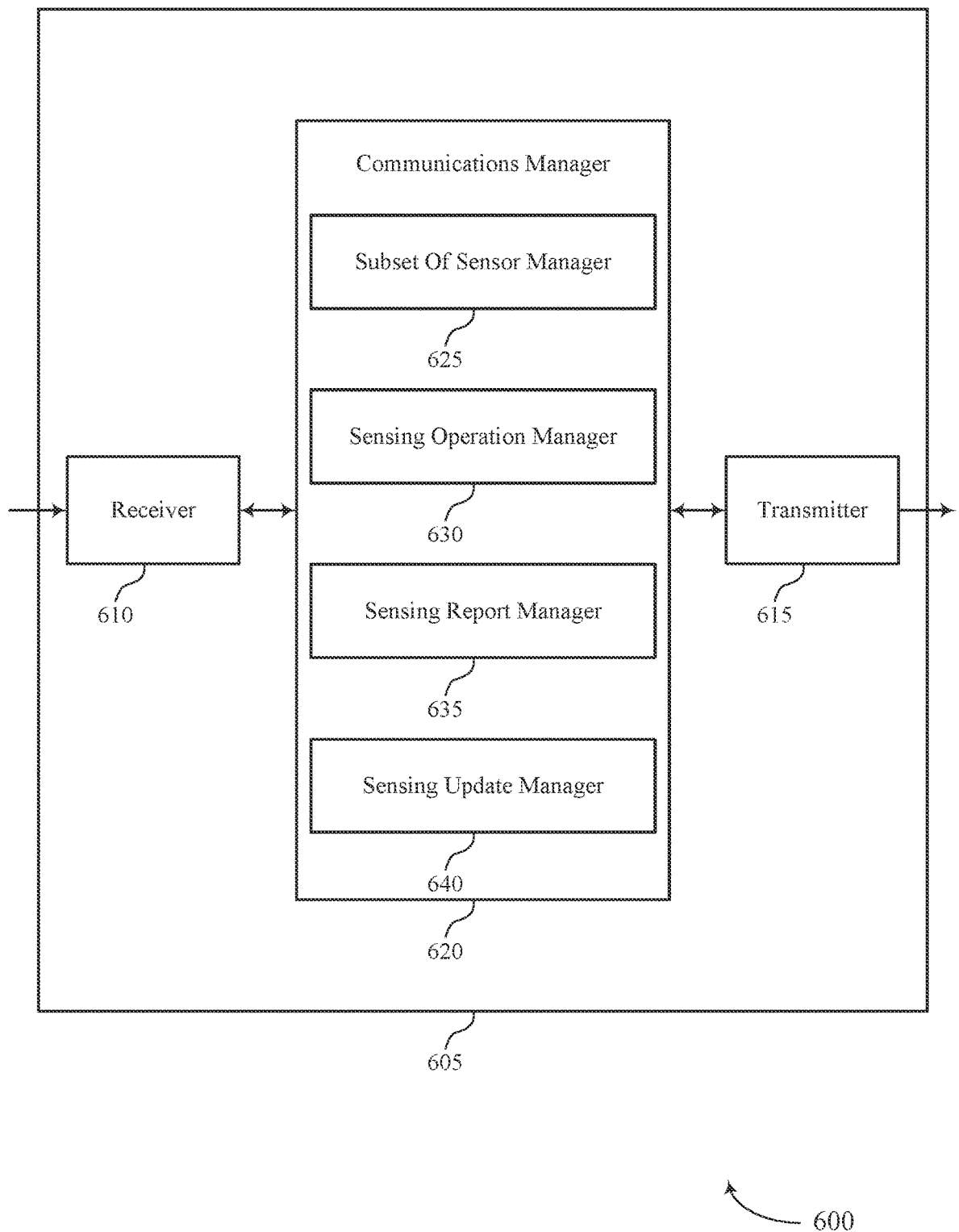

FIG. 6 shows a block diagram 600 of a device 605 that supports power efficient iterative sensor fusion in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to power efficient iterative sensor fusion). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to power efficient iterative sensor fusion). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of power efficient iterative sensor fusion as described herein. For example, the communications manager 620 may include a subset of sensor manager 625, a sensing operation manager 630, a sensing report manager 635, a sensing update manager 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The subset of sensor manager 625 may be configured as or otherwise support a means for selecting, based on a sensor selection criteria, a first subset of sensors from a set of available sensors of the UE, each sensor in the set of available sensors associated with a sensor type. The sensing operation manager 630 may be configured as or otherwise support a means for performing, using the first subset of sensors, sensing operations to obtain a first sensing data, the first sensing data including sensing data measured by the UE during the sensing operations. The sensing report manager 635 may be configured as or otherwise support a means for transmitting a first sensing report indicating the first sensing data. The subset of sensor manager 625 may be configured as or otherwise support a means for receiving, based on the first sensing report, a second sensing report indicating a second sensing data, the second sensing data including a unified sensing report based on the first sensing report from the UE and one or more additional sensing reports from other UE.

Additionally, or alternatively, the communications manager 620 may support wireless communications at a UE in accordance with examples as disclosed herein. The sensing report manager 635 may be configured as or otherwise support a means for receiving a sensing report indicating a sensing data, the sensing data including a unified sensing report based on one or more sensing reports associated with other UE. The sensing update manager 640 may be configured as or otherwise support a means for selecting, based on the sensing report, a first subset of sensors from a set of available sensors of the UE, each sensor in the set of available sensors associated with a sensor type. The sensing update manager 640 may be configured as or otherwise support a means for performing, using the first subset of sensors, sensing operations to obtain UE-measured sensing data during the sensing operations.

Figure 7:
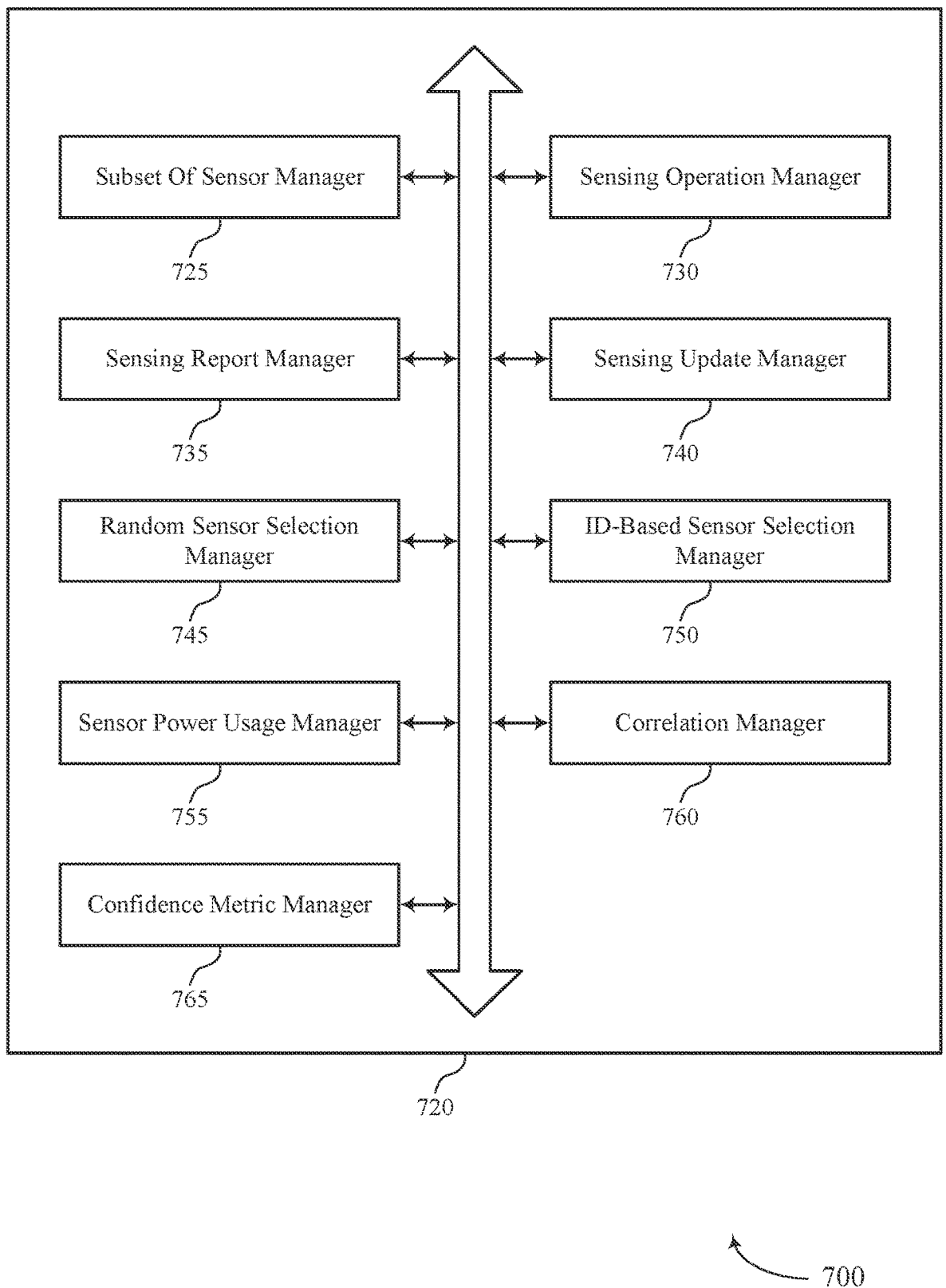
FIG. 7 shows a block diagram of a communications manager that supports power efficient iterative sensor fusion in accordance with aspects of the present disclosure.

FIG. 7 shows a block diagram 700 of a communications manager 720 that supports power efficient iterative sensor fusion in accordance with aspects of the present disclosure. The communications manager 720 may be an example of aspects of a communications manager 520, a communications manager 620, or both, as described herein. The communications manager 720, or various components thereof, may be an example of means for performing various aspects of power efficient iterative sensor fusion as described herein. For example, the communications manager 720 may include a subset of sensor manager 725, a sensing operation manager 730, a sensing report manager 735, a sensing update manager 740, a random sensor selection manager 745, an ID-based sensor selection manager 750, a sensor power usage manager 755, a correlation manager 760, a confidence metric manager 765, or any combination thereof. Each of these components may communicate, directly or indirectly, with one another (e.g., via one or more buses).

The communications manager 720 may support wireless communication at a UE in accordance with examples as disclosed herein. The subset of sensor manager 725 may be configured as or otherwise support a means for selecting, based on a sensor selection criteria, a first subset of sensors from a set of available sensors of the UE, each sensor in the set of available sensors associated with a sensor type. The sensing operation manager 730 may be configured as or otherwise support a means for performing, using the first subset of sensors, sensing operations to obtain a first sensing data, the first sensing data including sensing data measured by the UE during the sensing operations. The sensing report manager 735 may be configured as or otherwise support a means for transmitting a first sensing report indicating the first sensing data. In some examples, the subset of sensor manager 725 may be configured as or otherwise support a means for receiving, based on the first sensing report, a second sensing report indicating a second sensing data, the second sensing data including a unified sensing report based on the first sensing report from the UE and one or more additional sensing reports from other UE.

In some examples, the random sensor selection manager 745 may be configured as or otherwise support a means for selecting, according to the sensor selection criteria, the first subset of sensors randomly from the set of available sensors of the UE.

In some examples, the ID-based sensor selection manager 750 may be configured as or otherwise support a means for selecting, according to the sensor selection criteria, the first subset of sensors based on an identifier associated with the UE.

In some examples, the sensor power usage manager 755 may be configured as or otherwise support a means for selecting, according to the sensor selection criteria, the first subset of sensors randomly from the set of available sensors based on a power usage metric associated with the first subset of sensors.

In some examples, the sensing update manager 740 may be configured as or otherwise support a means for performing, based on the second sensing report, additional sensing operations to obtain updated first sensing data. In some examples, the sensing update manager 740 may be configured as or otherwise support a means for transmitting a third sensing report indicating the updated first sensing data.

In some examples, the correlation manager 760 may be configured as or otherwise support a means for determining, based on the second sensing report, that a correlation between the unified sensing report and the first sensing data fails to satisfy a sensing accuracy threshold. In some examples, the correlation manager 760 may be configured as or otherwise support a means for selecting, based on the correlation failing to satisfy the sensing accuracy threshold, a second subset of sensors from the set of available sensors of the UE, the second subset of sensors including more sensors than the first subset of sensors.

In some examples, the correlation manager 760 may be configured as or otherwise support a means for determining, based on the second sensing report, that the correlation between the unified sensing report and the first sensing data satisfies a low-end sensing accuracy threshold that is a lower threshold than the sensing accuracy threshold, where selecting the second subset of sensors including more sensors is based on the correlation satisfying the low-end sensing accuracy threshold.

In some examples, the correlation manager 760 may be configured as or otherwise support a means for determining, based on the second sensing report, that a correlation between the unified sensing report and the first sensing data satisfies a sensing accuracy threshold. In some examples, the correlation manager 760 may be configured as or otherwise support a means for selecting, based on the correlation satisfying the sensing accuracy threshold, a second subset of sensors from the set of available sensors of the UE, the second subset of sensors including less sensors than the first subset of sensors.

Additionally, or alternatively, the communications manager 720 may support wireless communications at a UE in accordance with examples as disclosed herein. In some examples, the sensing report manager 735 may be configured as or otherwise support a means for receiving a sensing report indicating a sensing data, the sensing data including a unified sensing report based on one or more sensing reports associated with other UE. The sensing update manager 740 may be configured as or otherwise support a means for selecting, based on the sensing report, a first subset of sensors from a set of available sensors of the UE, each sensor in the set of available sensors associated with a sensor type. In some examples, the sensing update manager 740 may be configured as or otherwise support a means for performing, using the first subset of sensors, sensing operations to obtain UE-measured sensing data during the sensing operations.

In some examples, the confidence metric manager 765 may be configured as or otherwise support a means for determining, based on the sensing report, that a confidence metric of the sensing data satisfies a confidence threshold. In some examples, the confidence metric manager 765 may be configured as or otherwise support a means for selecting the first subset of sensors from the set of available sensors of the UE based at least in part on the confidence metric satisfying the confidence threshold.

In some examples, the confidence metric manager 765 may be configured as or otherwise support a means for determining, based on the sensing report, that a confidence metric of the sensing data fails to satisfy a confidence threshold. In some examples, the confidence metric manager 765 may be configured as or otherwise support a means for selecting the first subset of sensors from the set of available sensors of the UE based at least in part on the confidence metric failing to satisfy the confidence threshold.

In some examples, the sensing report manager 735 may be configured as or otherwise support a means for transmitting an indication of the UE-measured sensing data.

Figure 8:
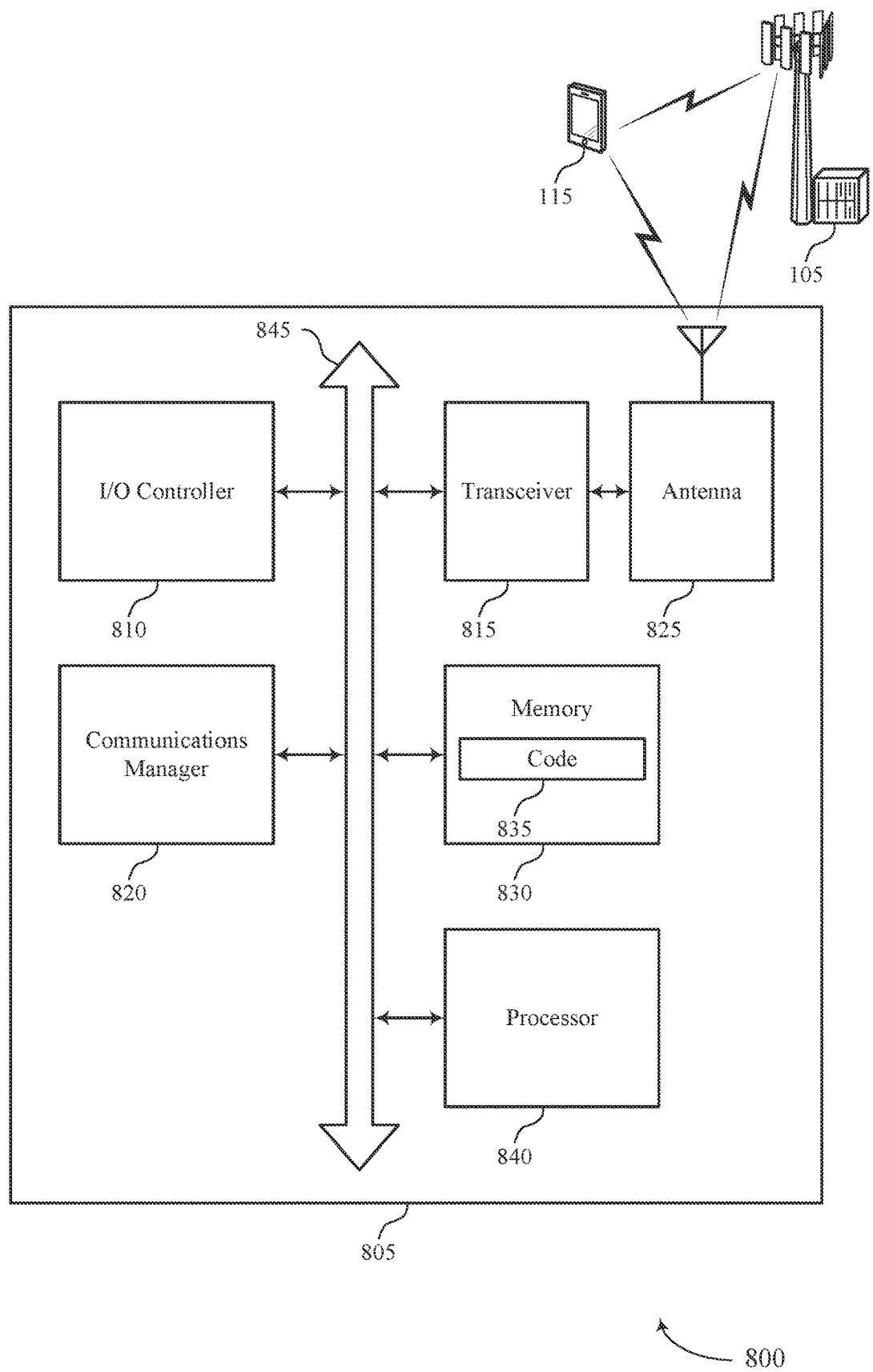
FIG. 8 shows a diagram of a system including a device that supports power efficient iterative sensor fusion in accordance with aspects of the present disclosure.

FIG. 8 shows a diagram of a system 800 including a device 805 that supports power efficient iterative sensor fusion in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM) The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting power efficient iterative sensor fusion). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for selecting, based on a sensor selection criteria, a first subset of sensors from a set of available sensors of the UE, each sensor in the set of available sensors associated with a sensor type. The communications manager 820 may be configured as or otherwise support a means for performing, using the first subset of sensors, sensing operations to obtain a first sensing data, the first sensing data including sensing data measured by the UE during the sensing operations. The communications manager 820 may be configured as or otherwise support a means for transmitting a first sensing report indicating the first sensing data. The communications manager 820 may be configured as or otherwise support a means for receiving, based on the first sensing report, a second sensing report indicating a second sensing data, the second sensing data including a unified sensing report based on the first sensing report from the UE and one or more additional sensing reports from other UE.

Additionally, or alternatively, the communications manager 820 may support wireless communications at a UE in accordance with examples as disclosed herein. For example, the communications manager 820 may be configured as or otherwise support a means for receiving a sensing report indicating a sensing data, the sensing data including a unified sensing report based on one or more sensing reports associated with other UE. The communications manager 820 may be configured as or otherwise support a means for selecting, based on the sensing report, a first subset of sensors from a set of available sensors of the UE, each sensor in the set of available sensors associated with a sensor type. The communications manager 820 may be configured as or otherwise support a means for performing, using the first subset of sensors, sensing operations to obtain UE-measured sensing data during the sensing operations.

By including or configuring the communications manager 820 in accordance with examples as described herein, the device 805 may support techniques for improving accuracy and efficiency of iterative sensor fusion based on intrinsic and extrinsic sensing information being used to more optimally select sensor(s) for sensing operations.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of power efficient iterative sensor fusion as described herein, or the processor 840 and the memory 830 may be otherwise configured to perform or support such operations.

Figure 9:
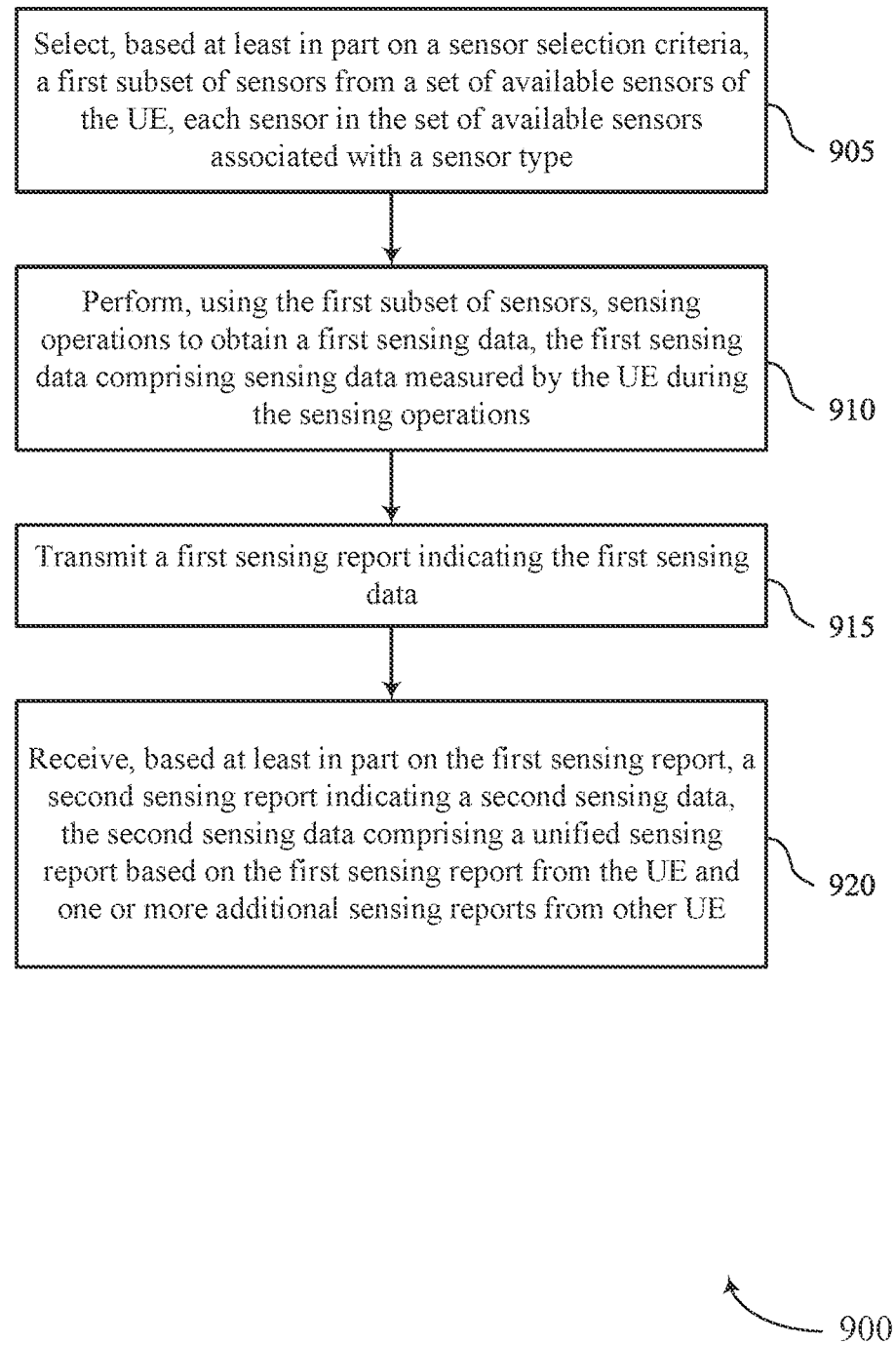
FIGS. 9 through 12 show flowcharts illustrating methods that support power efficient iterative sensor fusion in accordance with aspects of the present disclosure.

FIG. 9 shows a flowchart illustrating a method 900 that supports power efficient iterative sensor fusion in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include selecting, based on a sensor selection criteria, a first subset of sensors from a set of available sensors of the UE, each sensor in the set of available sensors associated with a sensor type. The operations of 905 may be performed in accordance with examples as disclosed herein. In some examples, aspects of the operations of 905 may be performed by a subset of sensor manager 725 as described with reference to FIG. 7.

At 910, the method may include performing, using the first subset of sensors, sensing operations to obtain a first sensing data, the first sensing data including sensing data measured by the UE during the sensing operations. The operations of 910 may be performed in accordance with examples as disclosed herein. In some examples, aspects of the operations of 910 may be performed by a sensing operation manager 730 as described with reference to FIG. 7.

At 915, the method may include transmitting a first sensing report indicating the first sensing data. The operations of 915 may be performed in accordance with examples as disclosed herein. In some examples, aspects of the operations of 915 may be performed by a sensing report manager 735 as described with reference to FIG. 7.

At 920, the method may include receiving, based on the first sensing report, a second sensing report indicating a second sensing data, the second sensing data including a unified sensing report based on the first sensing report from the UE and one or more additional sensing reports from other UE. The operations of 920 may be performed in accordance with examples as disclosed herein. In some examples, aspects of the operations of 920 may be performed by a subset of sensor manager 725 as described with reference to FIG. 7.

Figure 10:
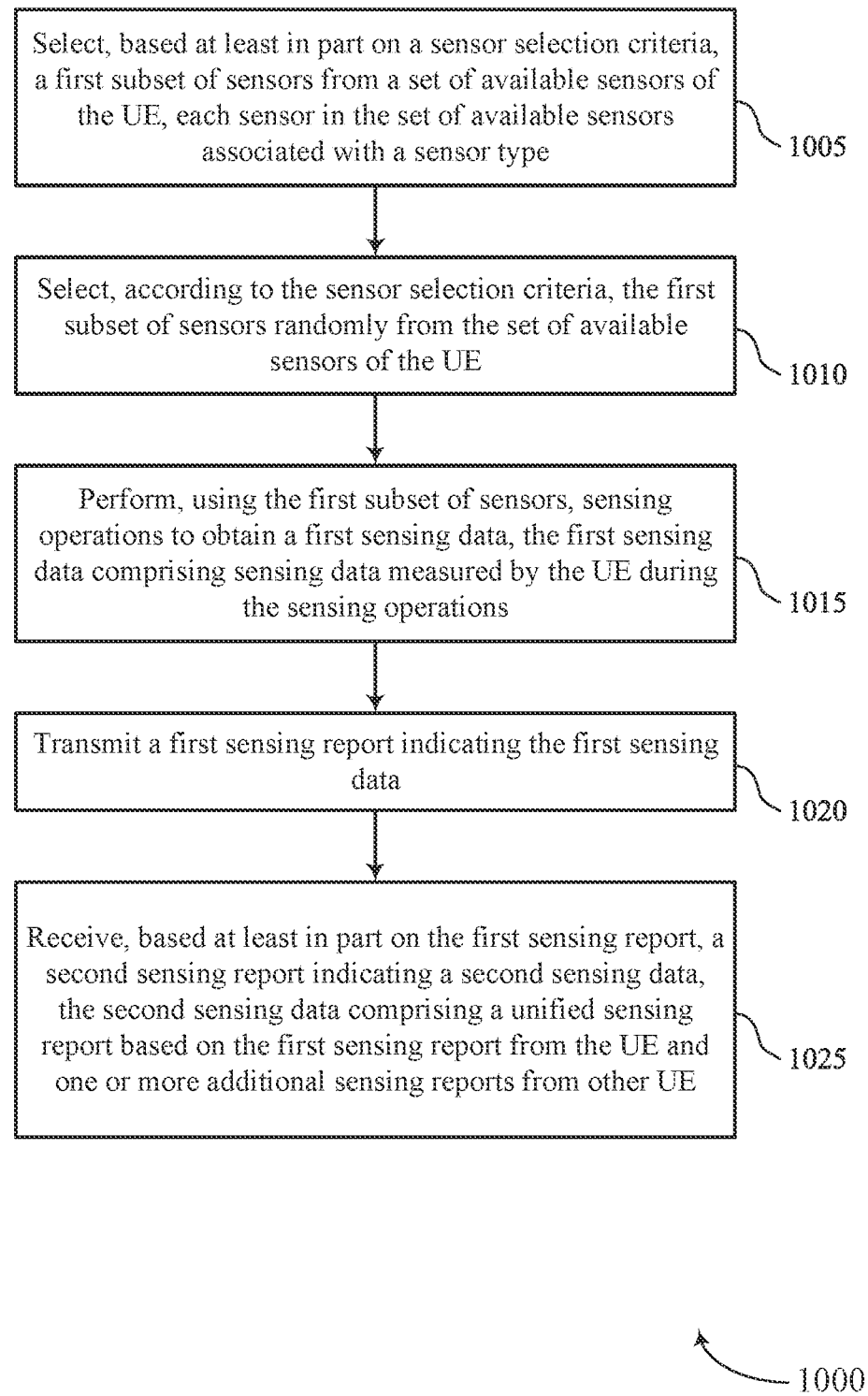

FIG. 10 shows a flowchart illustrating a method 1000 that supports power efficient iterative sensor fusion in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally. or alternatively, the UE may perform aspects of the described functions using special-purpose hardware.

At 1005, the method may include selecting, based on a sensor selection criteria, a first subset of sensors from a set of available sensors of the UE, each sensor in the set of available sensors associated with a sensor type. The operations of 1005 may be performed in accordance with examples as disclosed herein. In some examples, aspects of the operations of 1005 may be performed by a subset of sensor manager 725 as described with reference to FIG. 7.

At 1010, the method may include selecting, according to the sensor selection criteria, the first subset of sensors randomly from the set of available sensors of the UE. The operations of 1010 may be performed in accordance with examples as disclosed herein. In some examples, aspects of the operations of 1010 may be performed by a random sensor selection manager 745 as described with reference to FIG. 7.

At 1015, the method may include performing, using the first subset of sensors, sensing operations to obtain a first sensing data, the first sensing data including sensing data measured by the UE during the sensing operations. The operations of 1015 may be performed in accordance with examples as disclosed herein. In some examples, aspects of the operations of 1015 may be performed by a sensing operation manager 730 as described with reference to FIG. 7.

At 1020, the method may include transmitting a first sensing report indicating the first sensing data. The operations of 1020 may be performed in accordance with examples as disclosed herein. In some examples, aspects of the operations of 1020 may be performed by a sensing report manager 735 as described with reference to FIG. 7.

At 1025, the method may include receiving, based on the first sensing report, a second sensing report indicating a second sensing data, the second sensing data including a unified sensing report based on the first sensing report from the UE and one or more additional sensing reports from other UE. The operations of 1025 may be performed in accordance with examples as disclosed herein. In some examples, aspects of the operations of 1025 may be performed by a subset of sensor manager 725 as described with reference to FIG. 7.

Figure 11:
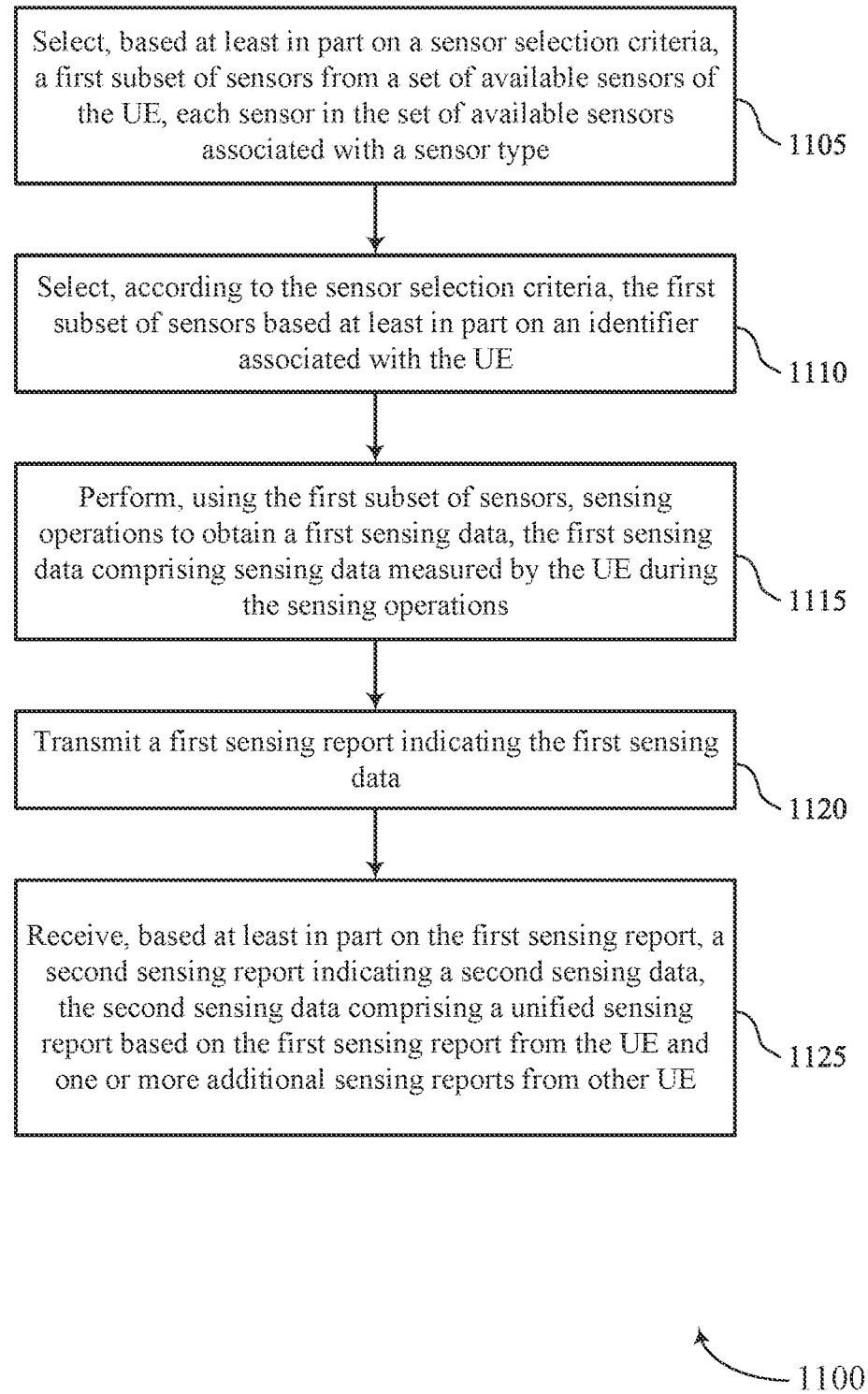

FIG. 11 shows a flowchart illustrating a method 1100 that supports power efficient iterative sensor fusion in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include selecting, based on a sensor selection criteria, a first subset of sensors from a set of available sensors of the UE, each sensor in the set of available sensors associated with a sensor type. The operations of 1105 may be performed in accordance with examples as disclosed herein. In some examples, aspects of the operations of 1105 may be performed by a subset of sensor manager 725 as described with reference to FIG. 7.

At 1110, the method may include selecting, according to the sensor selection criteria, the first subset of sensors based on an identifier associated with the UE. The operations of 1110 may be performed in accordance with examples as disclosed herein. In some examples, aspects of the operations of 1110 may be performed by an ID-based sensor selection manager 750 as described with reference to FIG. 7.

At 1115, the method may include performing, using the first subset of sensors, sensing operations to obtain a first sensing data, the first sensing data including sensing data measured by the UE during the sensing operations. The operations of 1115 may be performed in accordance with examples as disclosed herein. In some examples, aspects of the operations of 1115 may be performed by a sensing operation manager 730 as described with reference to FIG. 7.

At 1120, the method may include transmitting a first sensing report indicating the first sensing data. The operations of 1120 may be performed in accordance with examples as disclosed herein. In some examples, aspects of the operations of 1120 may be performed by a sensing report manager 735 as described with reference to FIG. 7.

At 1125, the method may include receiving, based on the first sensing report, a second sensing report indicating a second sensing data, the second sensing data including a unified sensing report based on the first sensing report from the UE and one or more additional sensing reports from other UE. The operations of 1125 may be performed in accordance with examples as disclosed herein. In some examples, aspects of the operations of 1125 may be performed by a subset of sensor manager 725 as described with reference to FIG. 7.

Figure 12:
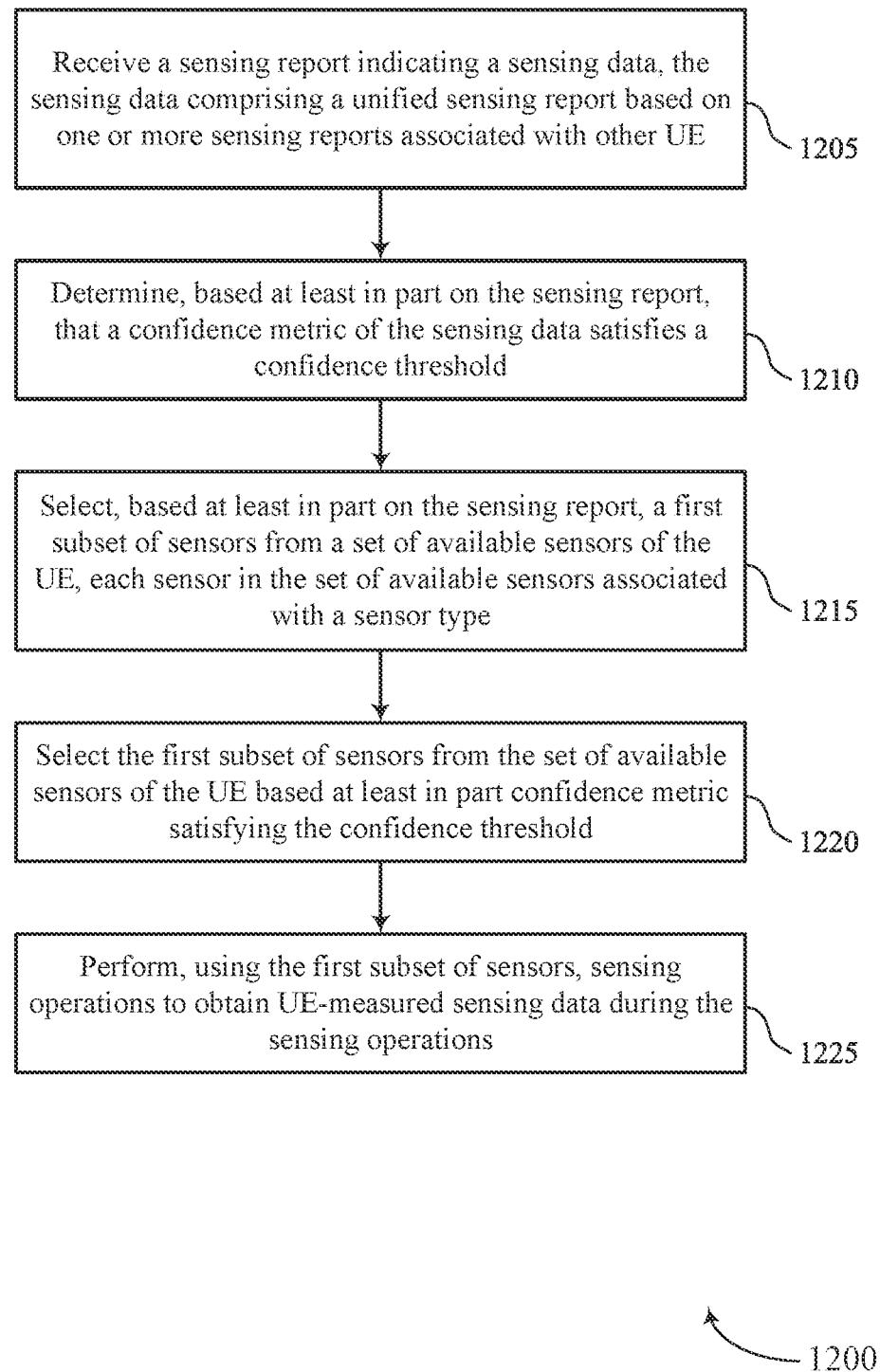

FIG. 12 shows a flowchart illustrating a method 1200 that supports power efficient iterative sensor fusion in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1205, the method may include receiving a sensing report indicating a sensing data, the sensing data including a unified sensing report based on one or more sensing reports associated with other UE. The operations of 1205 may be performed in accordance with examples as disclosed herein. In some examples, aspects of the operations of 1205 may be performed by a sensing report manager 735 as described with reference to FIG. 7.

At 1210, the method may include determining, based on the sensing report, that a confidence metric of the sensing data satisfies a confidence threshold. The operations of 1210 may be performed in accordance with examples as disclosed herein. In some examples, aspects of the operations of 1210 may be performed by a confidence metric manager 765 as described with reference to FIG. 7.

At 1215, the method may include selecting, based on the sensing report, a first subset of sensors from a set of available sensors of the UE, each sensor in the set of available sensors associated with a sensor type. The operations of 1215 may be performed in accordance with examples as disclosed herein. In some examples, aspects of the operations of 1215 may be performed by a sensing update manager 740 as described with reference to FIG. 7.

At 1220, the method may include selecting the first subset of sensors from the set of available sensors of the UE based at least in part on the confidence metric satisfying the confidence threshold. The operations of 1220 may be performed in accordance with examples as disclosed herein. In some examples, aspects of the operations of 1220 may be performed by a confidence metric manager 765 as described with reference to FIG. 7.

At 1225, the method may include performing, using the first subset of sensors, sensing operations to obtain UE-measured sensing data during the sensing operations. The operations of 1225 may be performed in accordance with examples as disclosed herein. In some examples, aspects of the operations of 1225 may be performed by a sensing update manager 740 as described with reference to FIG. 7.

The following provides an overview of aspects of the present disclosure:

Aspect 1: A method for wireless communication at a UE, comprising: selecting, based at least in part on a sensor selection criteria, a first subset of sensors from a set of available sensors of the UE, each sensor in the set of available sensors associated with a sensor type; performing, using the first subset of sensors, sensing operations to obtain a first sensing data, the first sensing data comprising sensing data measured by the UE during the sensing operations; transmitting a first sensing report indicating the first sensing data; and receiving, based at least in part on the first sensing report, a second sensing report indicating a second sensing data, the second sensing data comprising a unified sensing report based on the first sensing report from the UE and one or more additional sensing reports from other UE.

Aspect 2: The method of aspect 1, further comprising: selecting, according to the sensor selection criteria, the first subset of sensors randomly from the set of available sensors of the UE.

Aspect 3: The method of any of aspects 1 through 2, further comprising: selecting, according to the sensor selection criteria, the first subset of sensors based at least in part on an identifier associated with the UE.

Aspect 4: The method of any of aspects 1 through 3, further comprising: selecting, according to the sensor selection criteria, the first subset of sensors randomly from the set of available sensors based at least in part on a power usage metric associated with the first subset of sensors.

Aspect 5: The method of any of aspects 1 through 4, further comprising: performing, based at least in part on the second sensing report, additional sensing operations to obtain updated first sensing data; and transmitting a third sensing report indicating the updated first sensing data.

Aspect 6: The method of any of aspects 1 through 5, further comprising: determining, based at least in part on the second sensing report, that a correlation between the unified sensing report and the first sensing data fails to satisfy a sensing accuracy threshold; and selecting, based at least in part on the correlation failing to satisfy the sensing accuracy threshold, a second subset of sensors from the set of available sensors of the UE, the second subset of sensors comprising more sensors than the first subset of sensors.

Aspect 7: The method of aspect 6, further comprising: determining, based at least in part on the second sensing report, that the correlation between the unified sensing report and the first sensing data satisfies a low-end sensing accuracy threshold that is a lower threshold than the sensing accuracy threshold, wherein selecting the second subset of sensors comprising more sensors is based at least in part on the correlation satisfying the low-end sensing accuracy threshold.

Aspect 8: The method of any of aspects 1 through 7, further comprising: determining, based at least in part on the second sensing report, that a correlation between the unified sensing report and the first sensing data satisfies a sensing accuracy threshold; and selecting, based at least in part on the correlation satisfying the sensing accuracy threshold, a second subset of sensors from the set of available sensors of the UE, the second subset of sensors comprising less sensors than the first subset of sensors.

Aspect 9: A method for wireless communications at a UE, comprising: receiving a sensing report indicating a sensing data, the sensing data comprising a unified sensing report based on one or more sensing reports associated with other UE; selecting, based at least in part on the sensing report, a first subset of sensors from a set of available sensors of the UE, each sensor in the set of available sensors associated with a sensor type; and performing, using the first subset of sensors, sensing operations to obtain UE-measured sensing data during the sensing operations.

Aspect 10: The method of aspect 9, further comprising: determining, based at least in part on the sensing report, that a confidence metric of the sensing data satisfies a confidence threshold; and selecting the first subset of sensors from the set of available sensors of the UE based at least in part on the confidence metric satisfying the confidence threshold.

Aspect 11: The method of any of aspects 9 through 10, further comprising: determining, based at least in part on the sensing report, that a confidence metric of the sensing data fails to satisfy a confidence threshold; and selecting the first subset of sensors from the set of available sensors of the UE based at least in part on the confidence metric failing to satisfy the confidence threshold.

Aspect 12: The method of any of aspects 9 through 11, further comprising: transmitting an indication of the UE-measured sensing data.

Aspect 13: An apparatus for wireless communication at a UE, comprising a processor; memory coupled with the processor; and instructions stored in the memory and executable by the processor to cause the apparatus to perform a method of any of aspects 1 through 8.

Aspect 14: An apparatus for wireless communication at a UE, comprising at least one means for performing a method of any of aspects 1 through 8.

Aspect 15: A non-transitory computer-readable medium storing code for wireless communication at a UE, the code comprising instructions executable by a processor to perform a method of any of aspects 1 through 8.

Aspect 16: An apparatus for wireless communications at a UE, comprising a processor; memory coupled with the processor, and instructions stored in the memory and executable by the processor to cause the apparatus to perform a method of any of aspects 9 through 12.

Aspect 17: An apparatus for wireless communications at a UE, comprising at least one means for performing a method of any of aspects 9 through 12.

Aspect 18: A non-transitory computer-readable medium storing code for wireless communications at a UE, the code comprising instructions executable by a processor to perform a method of any of aspects 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B. or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   selecting, based at least in part on a sensor selection criteria, a first subset of sensors from a set of available sensors of the UE, each sensor in the set of available sensors associated with a sensor type;
   performing, using the first subset of sensors, sensing operations to obtain a first sensing data, the first sensing data comprising sensing data measured by the UE during the sensing operations;
   transmitting a first sensing report indicating the first sensing data; and
   receiving, based at least in part on the first sensing report, a second sensing report indicating a second sensing data, the second sensing data comprising a unified sensing report based on the first sensing report from the UE and one or more additional sensing reports from other UE.

2. The method of claim 1, further comprising:
   selecting, according to the sensor selection criteria, the first subset of sensors randomly from the set of available sensors of the UE.

3. The method of claim 1, further comprising:
   selecting, according to the sensor selection criteria, the first subset of sensors based at least in part on an identifier associated with the UE.

4. The method of claim 1, further comprising:
   selecting, according to the sensor selection criteria, the first subset of sensors randomly from the set of available sensors based at least in part on a power usage metric associated with the first subset of sensors.

5. The method of claim 1, further comprising:
   performing, based at least in part on the second sensing report, additional sensing operations to obtain updated first sensing data; and
   transmitting a third sensing report indicating the updated first sensing data.

6. The method of claim 1, further comprising:
   determining, based at least in part on the second sensing report, that a correlation between the unified sensing report and the first sensing data fails to satisfy a sensing accuracy threshold; and
   selecting, based at least in part on the correlation failing to satisfy the sensing accuracy threshold, a second subset of sensors from the set of available sensors of the UE, the second subset of sensors comprising more sensors than the first subset of sensors.

7. The method of claim 6, further comprising:
   determining, based at least in part on the second sensing report, that the correlation between the unified sensing report and the first sensing data satisfies a low-end sensing accuracy threshold that is a lower threshold than the sensing accuracy threshold, wherein selecting the second subset of sensors comprising more sensors is based at least in part on the correlation satisfying the low-end sensing accuracy threshold.

8. The method of claim 1, further comprising:
   determining, based at least in part on the second sensing report, that a correlation between the unified sensing report and the first sensing data satisfies a sensing accuracy threshold; and
   selecting, based at least in part on the correlation satisfying the sensing accuracy threshold, a second subset of sensors from the set of available sensors of the UE, the second subset of sensors comprising less sensors than the first subset of sensors.

9. A method for wireless communications at a user equipment (UE), comprising:
   receiving a sensing report indicating a sensing data, the sensing data comprising a unified sensing report based on one or more sensing reports associated with other UE;
   selecting, based at least in part on the sensing report, a first subset of sensors from a set of available sensors of the UE, each sensor in the set of available sensors associated with a sensor type; and
   performing, using the first subset of sensors, sensing operations to obtain UE-measured sensing data during the sensing operations.

10. The method of claim 9, further comprising:
    determining, based at least in part on the sensing report, that a confidence metric of the sensing data satisfies a confidence threshold; and
    selecting the first subset of sensors from the set of available sensors of the UE based at least in part on the confidence metric satisfying the confidence threshold.

11. The method of claim 9, further comprising:
    determining, based at least in part on the sensing report, that a confidence metric of the sensing data fails to satisfy a confidence threshold; and
    selecting the first subset of sensors from the set of available sensors of the UE based at least in part on the confidence metric failing to satisfy the confidence threshold.

12. The method of claim 9, further comprising:
    transmitting an indication of the UE-measured sensing data.

13. An apparatus for wireless communication at a user equipment (UE), comprising:
    a processor;
    memory coupled with the processor; and
    instructions stored in the memory and executable by the processor to cause the apparatus to:
       select, based at least in part on a sensor selection criteria, a first subset of sensors from a set of available sensors of the UE, each sensor in the set of available sensors associated with a sensor type;
       perform, using the first subset of sensors, sensing operations to obtain a first sensing data, the first sensing data comprising sensing data measured by the UE during the sensing operations;
       transmit a first sensing report indicating the first sensing data; and
       receive, based at least in part on the first sensing report, a second sensing report indicating a second sensing data, the second sensing data comprising a unified sensing report based on the first sensing report from the UE and one or more additional sensing reports from other UE.

14. The apparatus of claim 13, wherein the instructions are further executable by the processor to cause the apparatus to:
    select, according to the sensor selection criteria, the first subset of sensors randomly from the set of available sensors of the UE.

15. The apparatus of claim 13, wherein the instructions are further executable by the processor to cause the apparatus to:
    select, according to the sensor selection criteria, the first subset of sensors based at least in part on an identifier associated with the UE.

16. The apparatus of claim 13, wherein the instructions are further executable by the processor to cause the apparatus to:

select, according to the sensor selection criteria, the first subset of sensors randomly from the set of available sensors based at least in part on a power usage metric associated with the first subset of sensors.

17. The apparatus of claim 13, wherein the instructions are further executable by the processor to cause the apparatus to:

perform, based at least in part on the second sensing report, additional sensing operations to obtain updated first sensing data; and transmit a third sensing report indicating the updated first sensing data.

18. The apparatus of claim 13, wherein the instructions are further executable by the processor to cause the apparatus to:

determine, based at least in part on the second sensing report, that a correlation between the unified sensing report and the first sensing data fails to satisfy a sensing accuracy threshold; and select, based at least in part on the correlation failing to satisfy the sensing accuracy threshold, a second subset of sensors from the set of available sensors of the UE, the second subset of sensors comprising more sensors than the first subset of sensors.

19. The apparatus of claim 18, wherein the instructions are further executable by the processor to cause the apparatus to:

determine, based at least in part on the second sensing report, that the correlation between the unified sensing report and the first sensing data satisfies a low-end sensing accuracy threshold that is a lower threshold than the sensing accuracy threshold, wherein selecting the second subset of sensors comprising more sensors is based at least in part on the correlation satisfying the low-end sensing accuracy threshold.

20. The apparatus of claim 13, wherein the instructions are further executable by the processor to cause the apparatus to:

determine, based at least in part on the second sensing report, that a correlation between the unified sensing report and the first sensing data satisfies a sensing accuracy threshold; and select, based at least in part on the correlation satisfying the sensing accuracy threshold, a second subset of sensors from the set of available sensors of the UE, the second subset of sensors comprising less sensors than the first subset of sensors.

21. An apparatus for wireless communications at a user equipment (UE), comprising:

a processor;

memory coupled with the processor; and instructions stored in the memory and executable by the processor to cause the apparatus to:

receive a sensing report indicating a sensing data, the sensing data comprising a unified sensing report based on one or more sensing reports associated with other UE;

select, based at least in part on the sensing report, a first subset of sensors from a set of available sensors of the UE, each sensor in the set of available sensors associated with a sensor type; and perform, using the first subset of sensors, sensing operations to obtain UE-measured sensing data during the sensing operations.

22. The apparatus of claim 21, wherein the instructions are further executable by the processor to cause the apparatus to:

determine, based at least in part on the sensing report, that a confidence metric of the sensing data satisfies a confidence threshold; and select the first subset of sensors from the set of available sensors of the UE based at least in part on the confidence metric satisfying the confidence threshold.

23. The apparatus of claim 21, wherein the instructions are further executable by the processor to cause the apparatus to:

determine, based at least in part on the sensing report, that a confidence metric of the sensing data fails to satisfy a confidence threshold; and select the first subset of sensors from the set of available sensors of the UE based at least in part on the confidence metric failing to satisfy the confidence threshold.

24. The apparatus of claim 21, wherein the instructions are further executable by the processor to cause the apparatus to:

transmit an indication of the UE-measured sensing data.

* * * * *